(12) United States Patent
Nara et al.

(10) Patent No.: US 9,846,506 B2
(45) Date of Patent: Dec. 19, 2017

(54) DISPLAY DEVICE

(71) Applicant: Clarion Co., Ltd., Saitama-shi, Saitama (JP)

(72) Inventors: Norikazu Nara, Tokyo (JP); Katsumi Sano, Saitama (JP); Yusuke Matsumoto, Saitama (JP); Katsuya Matsuyuki, Yokohama (JP)

(73) Assignee: Clarion Co., Ltd., Saitama-shi (JP)

( * ) Notice: Subject to any disclaimer, the term of this patent is extended or adjusted under 35 U.S.C. 154(b) by 8 days.

(21) Appl. No.: 14/774,210

(22) PCT Filed: Mar. 4, 2014

(86) PCT No.: PCT/JP2014/055485
§ 371 (c)(1),
(2) Date: Sep. 10, 2015

(87) PCT Pub. No.: WO2014/141954
PCT Pub. Date: Sep. 18, 2014

(65) Prior Publication Data
US 2016/0018943 A1 Jan. 21, 2016

(30) Foreign Application Priority Data
Mar. 13, 2013 (JP) .................................. 2013-050791

(51) Int. Cl.
*G06F 3/041* (2006.01)
*G06F 3/0488* (2013.01)
(Continued)

(52) U.S. Cl.
CPC ............ *G06F 3/0416* (2013.01); *G06F 3/005* (2013.01); *G06F 3/0231* (2013.01); *G06F 3/038* (2013.01);
(Continued)

(58) Field of Classification Search
None
See application file for complete search history.

(56) References Cited

U.S. PATENT DOCUMENTS

2003/0156097 A1 8/2003 Kakihara et al.
2011/0257973 A1 10/2011 Chutorash et al.
(Continued)

FOREIGN PATENT DOCUMENTS

JP 2003-36141 A 2/2003
JP 2003-244343 A 8/2003
(Continued)

OTHER PUBLICATIONS

International Search Report dated Apr. 28, 2014 with English translation (Four (4) pages).
(Continued)

*Primary Examiner* — Joseph Haley
(74) *Attorney, Agent, or Firm* — Crowell & Moring LLP

(57) ABSTRACT

A display device configured to be connected to an information terminal, includes: a video reception unit that receives video information about a screen including a cursor from the information terminal; a touch panel that brings up the screen on display based on the video information received by the video reception unit and detects a touch position specified by a touch operation; and a transmission unit that transmits operation information in correspondence to the touch operation to the information terminal. The transmission unit transmits the operation information in a delay when the touch operation is performed continuously.

8 Claims, 10 Drawing Sheets

(51) Int. Cl.
  *G06F 3/023* (2006.01)
  *G06F 3/038* (2013.01)
  *G06F 3/0354* (2013.01)
  *G06F 3/14* (2006.01)
  *G06F 3/00* (2006.01)
  *G06F 3/0481* (2013.01)

(52) U.S. Cl.
  CPC ........ *G06F 3/03547* (2013.01); *G06F 3/0481* (2013.01); *G06F 3/0488* (2013.01); *G06F 3/04886* (2013.01); *G06F 3/1454* (2013.01); *G06F 2203/0381* (2013.01); *G06F 2203/0384* (2013.01)

(56) References Cited

U.S. PATENT DOCUMENTS

| | | | |
|---|---|---|---|
| 2012/0013463 A1* | 1/2012 | Higashi | G06F 3/03547 340/540 |
| 2012/0124469 A1 | 5/2012 | Nakajima et al. | |
| 2012/0144323 A1 | 6/2012 | Sirpal et al. | |
| 2012/0315887 A1 | 12/2012 | Konishi | |
| 2015/0205396 A1* | 7/2015 | Konishi | G06F 3/0488 345/173 |

FOREIGN PATENT DOCUMENTS

| | | |
|---|---|---|
| JP | 2007-272770 A | 10/2007 |
| JP | 2010-108212 A | 5/2010 |
| JP | 2012-118731 A | 6/2012 |
| JP | 2012-257156 A | 12/2012 |
| WO | WO 2012/065020 A1 | 5/2012 |
| WO | WO 2013/183765 A1 | 12/2013 |

OTHER PUBLICATIONS

Extended European Search Report issued in counterpart European Application No. 14765255.6 dated Nov. 29, 2016 (ten (10) pages).

* cited by examiner

FIG.6

| | | | |
|---|---|---|---|
| REGULATION INFORMATION | DISPLAY DURING TRAVEL | APPLICATION A | ○ |
| | | APPLICATION B | ○ |
| | | APPLICATION C | × |
| | OPERATION DURING TRAVEL | APPLICATION A | ○ |
| | | APPLICATION B | × |
| | | APPLICATION C | × |
| RESOLUTION INFORMATION | | SCREEN RESOLUTION IN TRANSVERSE DIRECTION (NUMBER OF PIXELS) | 1280 |
| | | SCREEN RESOLUTION IN LONGITUDINAL DIRECTION (NUMBER OF PIXELS) | 640 |
| INTERVAL TIME INFORMATION | | INTERVAL TIME (ms) | 100 |

DISPLAY DEVICE

TECHNICAL FIELD

The present invention relates to a display device.

BACKGROUND ART

There has been known in the related art a technology which makes it possible to bring up on display a display screen of a portable phone and a plurality of touch switches corresponding to respective operation keys of the portable phone on the display of an in-vehicle device and operate, when any particular touch switch among the touch switches is operated, the portable phone by providing an operation command for an operation key that corresponds to the particular touch switch from the in-vehicle device to the portable phone (see Patent Literature 1).

CITATION LIST

Patent Literature

Patent Literature 1: Japanese Laid Open Patent Publication No. 2003-244343

SUMMARY OF INVENTION

Technical Problem

In recent years, in addition to conventional portable phones in which operations are performed by using operation keys, smartphones that enable intuitive operations by using a touch panel are widely used. It is impossible to achieve operations of such smartphones, through the in-vehicle device according to the conventional technology as described in the patent literature 1. As stated above, conventionally, there has been proposed no technology for operating an information terminal, such as a smartphone, in which a touch panel input operation method is adopted, through a display device when it brings up on display a display screen of the information terminal thereon.

Solution to Problem

According to the 1st aspect of the present invention, a display device configured to be connected to an information terminal comprises: a video reception unit that receives video information about a screen including a cursor from the information terminal; a touch panel that brings up the screen on display based on the video information received by the video reception unit and detects a touch position specified by a touch operation; and a transmission unit that transmits operation information in correspondence to the touch operation to the information terminal, wherein the transmission unit transmits the operation information in a delay when the touch operation is performed continuously.

According to the 2nd aspect of the present invention, it is preferred that the display device according to the 1st aspect, the transmission unit transmits when the touch position is specified by the touch operation, first operation information for displacing the cursor from a predetermined reference position to the touch position, when specifying of the touch position is cancelled after the first operation information is transmitted, second operation information for returning the cursor from the touch position to the reference position, and when a next touch operation is performed within a predetermined interval time after the second operation information is transmitted, the first operation information for next session in a delay.

According to the 3rd aspect of the present invention, it is preferred that in the display device according to the 2nd aspect, the operation information includes displacement quantity information that represents a displacement quantity of the cursor, and the transmission unit transmits displacement quantity information in correspondence to a distance from the reference position to the touch position as the first operation information and predetermined displacement information in correspondence to the reference position as the second operation information.

According to the 4th aspect of the present invention, it is preferred that in the display device according to the 2nd or 3rd aspect, the transmission unit transmits when the touch position is specified by the touch operation, third operation information representing a predetermined button operation after the first operation information is transmitted, and when the specifying of the touch position is cancelled after the third operation information is transmitted, fourth operation information representing cancellation of the button operation and subsequently the second operation information.

According to the 5th aspect of the present invention, it is preferred that in the display device according to the 4th aspect, the transmission unit sets the displacement quantities of the cursor at 0 in the third operation information and the fourth operation information, respectively.

According to the 6th aspect of the present invention, it is preferred that in the display device according to the 2nd or 3rd aspect, the transmission unit transmits, when the touch position is displaced during the touch operation, operation information including button operation information representing a predetermined button operation and displacement quantity information in correspondence to displacement quantity of the touch position after the first operation information is transmitted.

According to the 7th aspect of the present invention, it is preferred that in the display device according to the 4th or 5th aspect, the transmission unit transmits, when the touch position is displaced during the touch operation, operation information including button operation information representing a predetermined button operation and displacement quantity information in correspondence to displacement quantity of the touch position after the first operation information and the third operation information is transmitted.

According to the 8th aspect of the present invention, the display device according to any one of the 2nd to 7th aspects may further comprise: an interval time information acquisition unit that acquires interval time information about the interval time from the information terminal, and it is preferred that the transmission unit determines whether to transmit the operation information in the delay based on the interval time information acquired by the interval time information acquisition unit.

According to the 9th aspect of the present invention, it is preferred that in the display device according to the 8th aspect, the interval time information is transmitted by the information terminal based on a policy file delivered from a predetermined server device to the information terminal.

According to the 10th aspect of the present invention, it is preferred that in the display device according to any one of the 1st to the 9th aspects, the transmission unit transmits the operation information by using Bluetooth standard or a communication format for a mouse used in USB.

According to the 11th aspect of the present invention, a display device configured to be connected to an information terminal, the display device comprises: a video reception unit that receives video information of a screen including a cursor from the information terminal; a touch panel that brings up the screen on display based on the video information received by the video reception unit and detects a touch position specified by a touch operation; and a transmission unit that transmits operation information in correspondence to the touch operation to the information terminal, wherein the transmission unit transmits, when the touch position is displaced during the touch operation, operation information including button operation information representing a predetermined button operation and displacement quantity information in correspondence to displacement quantity of the touch position.

Advantageous Effect of the Invention

According to the present invention, when a display screen of an information terminal, in which a touch panel input operation method is adopted, is brought up on display on a display device, it is possible to operate the information terminal through the display device.

BRIEF DESCRIPTION OF THE DRAWINGS

FIG. 6 A diagram showing an example of the information recorded in the policy file delivered to the portable terminal.

DESCRIPTION OF EMBODIMENTS

First Embodiment

Figure 1:
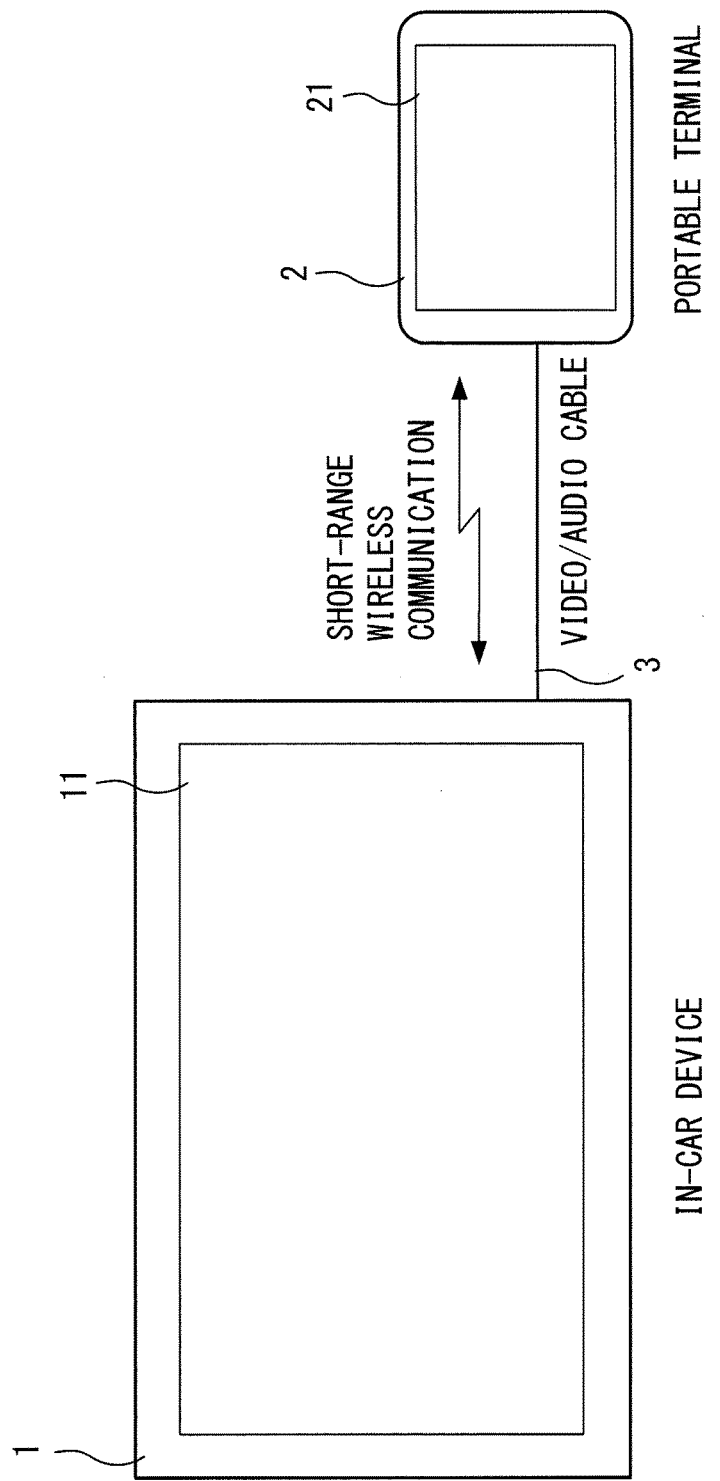
FIG. 1 A diagram showing the configuration of the in-vehicle information system achieved in an embodiment of the present invention.

FIG. 1 shows the configuration of the in-vehicle information system achieved in an embodiment of the present invention. The in-vehicle information system in FIG. 1, which is used as an onboard system installed in a vehicle, is configured by connecting an in-vehicle device 1 with a portable terminal 2 through short-range wireless communication and through wired communication enabled via a video/audio cable 3. The in-vehicle device 1 is installed at a fixed position within the vehicle, at, for instance, the instrument panel in the vehicle. The portable terminal 2 is a portable information terminal that can be carried by the user, such as a portable telephone or a smart phone. It is to be noted that short-range wireless communication between the in-vehicle device 1 and the portable terminal 2 may be carried out in compliance with, for instance, the Bluetooth (registered trademark) standard. In addition, the wired communication via the video/audio cable 3 may be achieved in compliance with, for instance, the HDMI (high definition multimedia interface) (registered trademark) standard.

A display unit 11 is provided to the in-vehicle device 1. The display unit 11 is a touch panel that is capable of displaying images and video images of various types, and, for example, may consist of a combination of resistive film type touch panel switches and a liquid crystal display. By performing touch operation with his finger or the like at any desired position on the display unit 11, and by thus designating an icon or operation button or the like displayed in that position, the user is able to cause the portable terminal 2 to execute various functions as desired. It should be understood that, in addition to the display unit 11, it would also be acceptable further to provide the in-vehicle device 1 with various operation switches corresponding to predetermined operations.

A display unit 21 is provided to the portable terminal 2. The display unit 21 is a touch panel that is capable of displaying images and video images of various types, and may, for example, consist of a combination of capacitance type touch panel switches and a liquid crystal display. By touching any desired position on the display unit 21, according to the details of the images or video images being displayed on the display unit 21, the user is able to cause the portable terminal 2 to execute various functions as desired. It is to be noted that while the display unit 21 in this example is a touch panel, the present invention may be adopted in conjunction with a standard display monitor instead of a touch panel. In such a case, it is desirable that the portable terminal 2 include various types of operation switches corresponding to specific contents or details of processing executed by the portable terminal 2. As an alternative, the present invention may be adopted in conjunction with a display unit 21 constituted with a touch panel-type display monitor in an portable terminal 2 that also includes operation switches, each corresponding to a specific operation.

Figure 2:
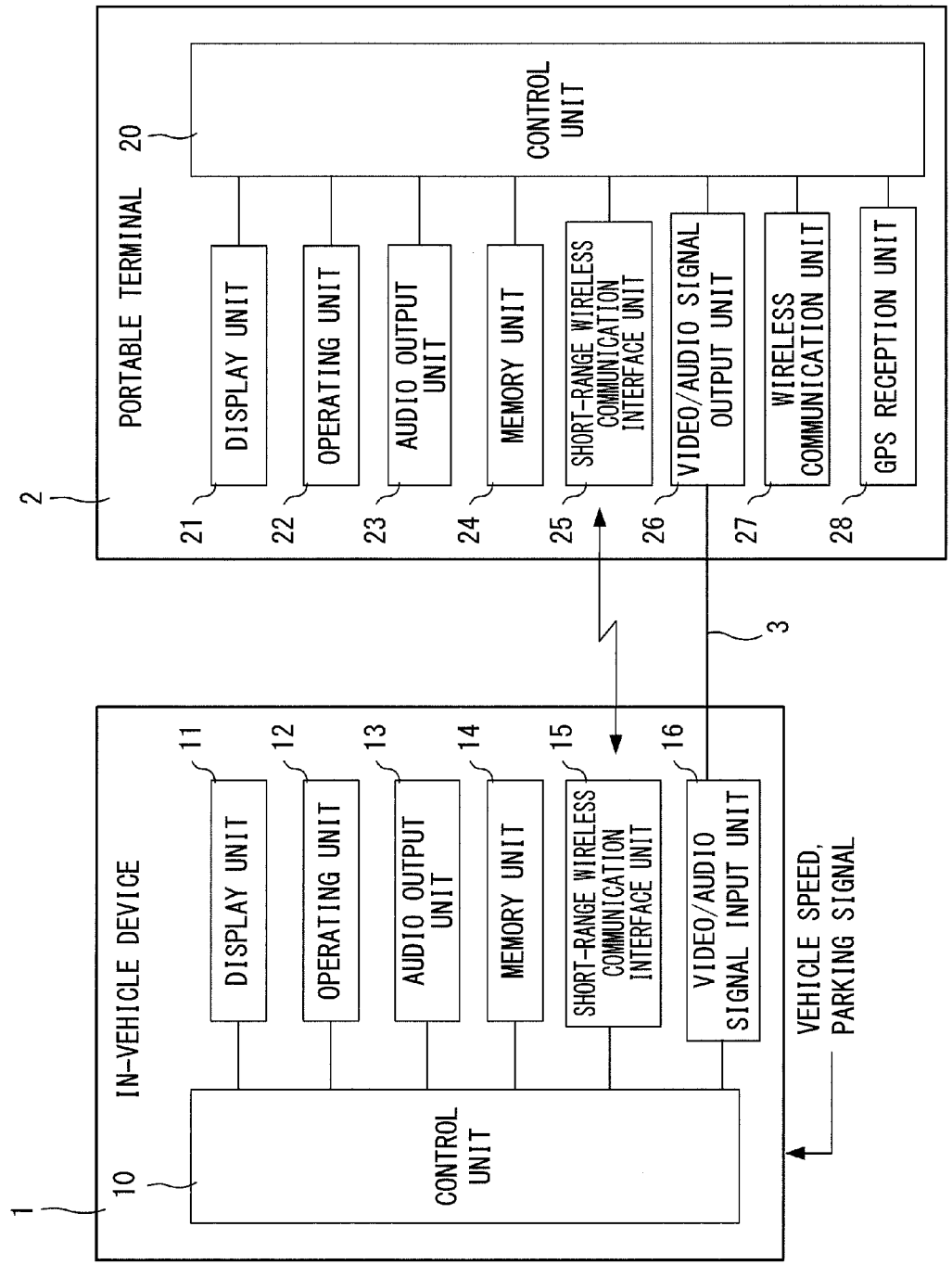
FIG. 2 A block diagram showing the structures adopted in the in-vehicle device and the portable terminal.

FIG. 2 is a block diagram showing the structures of the in-vehicle device 1 and the portable terminal 2. As shown in FIG. 2, the in-vehicle device 1 includes a control unit 10, the display unit 11, an operation unit 12, an audio output unit 13, a memory unit 14, a short-range wireless communication interface unit 15 and a video/audio signal input unit 16. The portable terminal 2 includes a control unit 20, the display unit 21, an operation unit 22, an audio output unit 23, a memory unit 24, a short-range wireless communication interface unit 25, a video/audio signal output unit 26, a wireless communication unit 27 and a GPS (global positioning system) receiver unit 28.

The control unit 10 in the in-vehicle device 1, which is constituted with a microprocessor, various peripheral circuits, a RAM, a ROM and the like, executes various types of processing based upon a control program recorded in the memory unit 14. Various types of image display processing, audio output processing and the like are enabled through processing executed by the control unit 10.

In addition, the control unit 10 obtains a vehicle speed signal and a parking signal output from the vehicle. The control unit 10 determines whether the vehicle is currently in a traveling state or in a stationary state based upon the vehicle speed signal and the parking signal. It is to be noted that the vehicle speed signal and the parking signal may be provided from the vehicle to the control unit 10 in the form of a vehicle speed pulse output via a CAN (controller area network) configuring an onboard communication network, from a vehicle speed sensor installed in the vehicle.

As previously described with reference to FIG. 1, the display unit 11 is a display monitor that may consist of a liquid crystal display or the like. The operation unit 12 is a section for detecting touch operation by the user on the display unit 11, and corresponds to the touch panel switches described above. It should be understood that though the display unit 11 and the operation unit 12 are shown separately in FIG. 2, actually these are integrated together and constitute a touch panel. Moreover, if operation switches are provided to the in-vehicle device 1 as previously described, then these operation switches are also included in the operation unit 12. The information of input operations that the user performs on the operation unit 12 is output to the control unit 10, and is reflected in the processing performed by the control unit 10.

The audio output unit 13, which includes an amplifier, a speaker and the like, is capable of outputting various types of sound under control executed by the control unit 10. For instance, music played back by reproducing music data read out from the portable terminal 2 or a recording medium (not shown), audio guidance used to guide the vehicle to a destination, or the like can be output from the audio output unit 13.

The memory unit 14, which is a non-volatile data storage device, may be constituted with an HDD (hard disk drive), a flash memory or the like. Various types of data, including the control program used by the control unit 10, as explained earlier, are stored in the memory unit 14. Data are read out from the memory unit 14 and written into the memory unit 14 as needed under control executed by the control unit 10.

The short-range wireless communication interface unit 15 executes, under control executed by the control unit 10, wireless interface processing required to enable short-range wireless communication with the portable terminal 2. For instance, it converts information output from the control unit 10 to a wireless signal in a predetermined signal format and transmits the wireless signal to the portable terminal 2. It also receives information output from the portable terminal 2 as a wireless signal in a predetermined signal format and outputs the received wireless signal information to the control unit 10. The short-range wireless communication interface unit 15 executes such interface processing in compliance with a specific communication standard such as Bluetooth.

The video/audio signal input unit 16 converts a video signal and an audio signal input from the portable terminal 2 via the video/audio cable 3 to image (video image) data for screen display and audio data for audio output respectively and outputs them to the control unit 10. The control unit 10, having obtained the image data and the audio data output from the video/audio signal input unit 16, controls the display unit 11 so as to bring up on display at the display unit 11 a screen image based upon the video data and also enables the audio output unit 13 to output sound based upon the audio data by controlling the audio output unit 13.

On the other hand, the control unit 20 in the portable terminal 2 is constituted with a microprocessor, various peripheral circuits, a RAM, a ROM and the like, as is the control unit 10 in the in-vehicle device 1, and executes various types of processing based upon a control program recorded in the memory unit 24.

As explained earlier, the display unit 21 is a touch panel-type display monitor. The operation unit 22 is used for purposes of user input operation detection. It is to be noted that while the display unit 21 and the operation unit 22 are shown as separate structural elements in FIG. 2, the display unit 21 and the operation unit 22 are, in fact, integrated together to constitute a touch panel, as is the display unit 11 explained earlier. In the alternative configuration described earlier, which includes operation switches disposed at the portable terminal 2, the operation switches correspond to the operation unit 22. Details of a user input operation performed at the operation unit 22 are output to the control unit 20 and are reflected in the processing executed by the control unit 20.

The audio output unit 23, which includes an amplifier, a speaker and the like, is capable of outputting various types of sound under control executed by the control unit 20. During a phone conversation carried out via the portable terminal 2, for instance, the voice of the other party is output from the audio output unit 23.

In the memory unit 24, which is a non-volatile data storage device similar to the memory unit 14 in the in-vehicle device 1, various types of data to be used in the processing executed by the control unit 20 are stored. Various application programs (hereafter simply referred to as applications), acquired by the user in advance, are also stored in the memory unit 24. The user is able to select a specific application among the various applications stored in the memory unit 24 and have it executed by the control unit 20. In this manner, various functions can be fulfilled in the portable terminal 2.

As does the short-range wireless communication interface unit 15 in the in-vehicle device 1, the short-range wireless communication interface unit 25 executes wireless interface processing in compliance with the predetermined communication standard. Namely, information communication between the in-vehicle device 1 and the portable terminal 2 is achieved as the short-range wireless communication interface unit 15 and the short-range wireless communication interface unit 25 exchange information with each other through wireless communication.

The video/audio signal output unit 26 converts an image (video image) and sound generated by the control unit 20 to a video signal and an audio signal in compliance with a predetermined communication standard such as HDMI and outputs the signals resulting from the conversion to the in-vehicle device 1 via the video/audio cable 3. As the video signal and the audio signal are input at the video/audio signal input unit 16 in the in-vehicle device 1, an image (a screen) identical to that brought up on display at the display unit 21 in the portable terminal 2 is brought up on display at the display unit 11 in the in-vehicle device 1 and sound identical to that output from the audio output unit 23 in the portable terminal 2 is also output from the audio output unit 13 in the in-vehicle device 1. The term "video mirroring" is often used to refer to this function.

The wireless communication unit 27 performs wireless communication to connect the portable terminal 2 with another portable terminal or a server via a wireless communication network (not shown). Through the wireless communication carried out via the wireless communication unit 27, the portable terminal 2 is able to perform a telephone conversation with another portable terminal, download a desired application from a server, and the like. It is to be noted that the wireless communication network enabling wireless communication carried out via the wireless communication unit 27 may be, for instance, a portable telephone network or the Internet, connection with which can be established via a wireless LAN.

The GPS receiver unit 28 receives GPS signals transmitted from GPS satellites and outputs the GPS signals thus received to the control unit 20. Each GPS signal carries, as information that can be used to determine the current position of the portable terminal 2 and the current time, information indicating the position of the GPS satellite having transmitted the particular GPS signal and the transmission time point. Thus, the current position and the current time can be calculated in the control unit 20 based upon information carried in GPS signals received from equal to or more than a predetermined minimum number of GPS satellites.

Next, a coordinated function achieved by the in-vehicle device 1 and the portable terminal 2 in this in-vehicle information system will be described. A coordinated function achieved by the in-vehicle device 1 and the portable terminal 2 is available in the in-vehicle information system. When the coordinated function is in effect, an image and sound corresponding to a specific application among the various applications, executed at the portable terminal 2 connected with the in-vehicle device 1 can be displayed and output at the in-vehicle device 1. In addition, contents of a user operation performed at the in-vehicle device 1 can be reflected in the operation of the application being executed at the portable terminal 2.

For instance, navigation processing may be executed so as to guide the vehicle to a destination by executing a navigation application at the portable terminal 2. In the navigation processing, a map screen image with a map of an area around of the current position drawn therein is created at the portable terminal 2 and image information indicating the map screen image is output, by using the video signal explained earlier, to the video/audio signal input unit 16 from the video/audio signal output unit 26 via the video/audio cable 3. Through this processing, the map screen image is transmitted from the portable terminal 2 to the in-vehicle device 1 so as to bring up the map screen image of the area around the current position at the display unit 11 in the in-vehicle device 1. In addition, as the user sets a destination through a user operation performed at the operation unit 12 in the in-vehicle device 1 or at the operation unit 22 in the portable terminal 2, a search for a recommended route from the current vehicle position designated as a departure point to the destination having been set is executed at the portable terminal 2. As the vehicle approaches a guidance requiring point on the recommended route, audio guidance data indicating the direction along which the vehicle is to advance at the particular guidance requiring point are transmitted from the portable terminal 2 to the in-vehicle device 1. As a result, audio guidance can be output from the audio output unit 13 in the in-vehicle device 1. It is to be noted that specific signals may be output from the portable terminal 2 to the in-vehicle device 1, each in correspondence to the timing of the audio guidance data output start and the timing of the audio guidance data output end. Through these measures, it can be ensured that the user will be able to hear the audio guidance clearly, even if other audio data are being output via the radio, the CD player or the like in the in-vehicle device 1, by lowering the sound volume for the other audio output during the audio guidance output. As described above, the in-vehicle device 1 provides the user with guidance information so that the user is able to drive the vehicle to the destination without getting lost by displaying a map image at the display unit 11 and outputting audio guidance via the audio output unit 13.

It is to be noted that various types of data including map data needed by the portable terminal 2 when executing the navigation application may be stored in advance in the memory unit 24 in the portable terminal 2. As an alternative, only data that are absolutely necessary may be stored in the memory unit 24 and in such a case, the portable terminal 2 should be able to connect with a specific server via the wireless communication unit 27 in order to obtain necessary additional data each time it executes the navigation application.

At the portable terminal 2, an application selected by the user, among the plurality of applications including a navigation application such as that described above, is executed. The user is able to select a desired application he wishes to be executed at the portable terminal 2 by operating the operation unit 22 in a menu screen on display at the display unit 21 in the portable terminal 2. In the menu screen, for instance, icons that represent applications for which a coordinated function is available are brought up on display in juxtaposition. When the user selects any one of the icons by operating a touch panel or the like in the menu screen, an application in correspondence to the selected icon is executed at the portable terminal 2.

In addition, the portable terminal 2 transmits a menu screen image in the form of a video signal provided from the video/audio signal output unit 26, to the in-vehicle device 1. Based upon the video signal transmitted from the portable terminal 2, the in-vehicle device 1 brings up the menu screen on display at the display unit 11. As the user selects a desired application in this menu screen by a touch operation to the operation unit 12, which is a part of a touch panel, operation information corresponding to the touch operation is transmitted via the short-range wireless communication interface unit 15 from the in-vehicle device 1 to the portable terminal 2.

The operation information transmitted from the in-vehicle device 1 as described above is received at the short-range wireless communication interface unit 25 in the portable terminal 2 and the operation information thus received is then output to the control unit 20. Based upon the operation information received as described above, the control unit 20 identifies the application selected by the user at the in-vehicle device 1 and executes the selected application. Through this process, the user is able to select a desired application in the menu screen on display at the in-vehicle device 1, just as he is able to select a desired application in the menu screen brought up on display at the display unit 21 at the portable terminal 2, and have the selected application executed in the portable terminal 2.

It is to be noted that the control unit 20 is able to execute each application either in the foreground or in the background. Any application being executed in the foreground is designated as a subject application for image display and operation input both at the in-vehicle device 1 and at the portable terminal 2. While the control unit 20 does execute the corresponding processing for an application running in the background, the application is not a subject application for image display or operation input at the in-vehicle device 1 or the portable terminal 2. However, sound originating from the application being executed in the background may be output.

In order to enable a coordinated function such as that described above achieved by connecting the in-vehicle device 1 to the portable terminal 2, an application referred to as an application manager is installed in advance and stored in the memory unit 24 at the portable terminal 2. Namely, a plurality of applications including the application manager is stored in the memory unit 24. As the portable terminal 2 becomes connected to the in-vehicle device 1, the application manager is read out from the memory unit 24 and is executed by the control unit 20.

Figure 3:
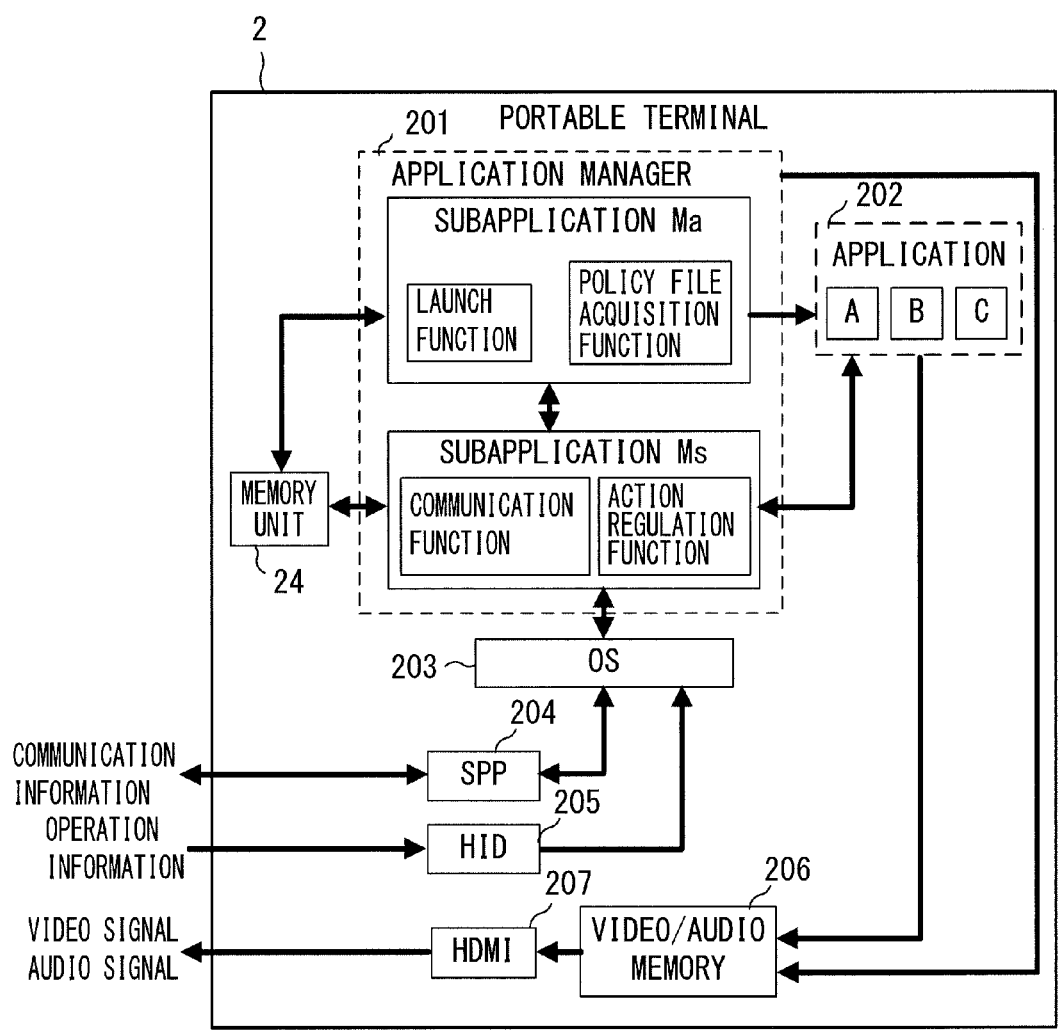
FIG. 3 A schematic diagram illustrating the software structure adopted in the portable terminal.

FIG. 3 is a diagram schematically illustrating the software structure adopted in the portable terminal 2. An application manager 201 in FIG. 3 includes a sub-application Ma and a sub-application Ms.

The sub-application Ma has a launch function for starting up applications other than the application manager 201 itself and a policy file acquisition function for obtaining a policy file that records various types of information need for cooperated operation between the in-vehicle device 1 and the portable terminal 2. The control unit 20 is able to use these functions by executing the sub-application Ma in the foreground. For instance, the launch function is used to call up another application and have that application executed in the foreground by the control unit 20, instead of the sub-application Ma. In addition, the policy file acquisition function is used to obtain data file, called the policy file, from an external server device or the like. The policy file records regulation information indicating contents of action regulation to be imposed on each application among the plurality of applications while the vehicle is in a traveling state, resolution information for the display unit 21, interval time information described later or the like. The obtained policy file is stored in the memory unit 24.

The sub-application Ms has a communication function to be engaged when connecting the portable terminal 2 to the in-vehicle device 1 and an action regulation function for imposing action regulation while the vehicle is in the traveling state. The control unit 20 is able to use these functions by executing the sub-application Ms in the background. For instance, the communication function enables execution of communication processing so as to allow the information terminal 2 and the in-vehicle device 1 to exchange information needed for coordinated operations by referencing the policy file stored in the memory unit 24. In addition, the action regulation function is used to determine the contents of the action regulation to be imposed on the application being executed in the foreground while the vehicle is in a traveling state by referencing the regulatory information indicated in the policy file stored in the memory unit 24. The determination results is transmitted from the portable terminal 2 to the in-vehicle device 1 through the communication function and is utilized in the in-vehicle device 1 when imposing action restriction while the vehicle is in a traveling state.

As explained above, the application manager 201 is configured with two separate sub-applications, i.e., the sub-application Ma executed by the control unit 20 in the foreground and the sub-application Ms executed by the control unit 20 in the background. By adopting this structure, optimization of function assignments within the application manager 201 is achieved so as to assign functions best suited for foreground execution as foreground functions and assign functions best suited for background execution as background functions.

The application manager 201 calls up a given application among various applications 202 through the launch function of the sub-application Ma. The application thus called up is then executed by the control unit 20 in the foreground instead of the sub-application Ma. It is to be noted that the following description will be given in reference to FIG. 3 by assuming that application A is being executed.

An OS (operating system) 203 is a software program used to manage the overall operations of the portable terminal 2. When the portable terminal 2 is connected to the in-vehicle device 1, the OS 203 acts as a go-between for information output from the sub-application Ms executed by the control unit 20 in the background and input to an SPP Profile 204 and an HID profile 205 and vice versa. The SPP profile 204 and the HID profile 205 are drivers used in short-range wireless communication carried out between the in-vehicle device 1 and the portable terminal 2. These drivers are standardized as part of the standard used in compliance with Bluetooth.

The SPP profile 204 executes processing for receiving and transmitting the communication information that is input and output between the portable terminal 2 and in the in-vehicle device 1 through the communication function of the sub-application Ms. The communication information transmitted from the portable terminal 2 to the in-vehicle device 1 includes the information indicating the results of the determination made with regard to the action regulation contents through the action regulation function of the sub-application Ms, the resolution information for the display unit 21, the interval time information and so on indicated in the obtained policy file. The communication information transmitted from the in-vehicle device 1 to the portable terminal 2 includes traveling information transmitted based upon the vehicle traveling state. The HID profile 205 executes processing for receiving operation information output in correspondence to contents of the user operation performed at the in-vehicle device 1. The contents of the various types of information received by the SPP profile 204 and the HID profile 205 are output to the sub-application Ms via the OS 203 and are then transferred to the application, the execution of which is underway, through the communication function of the sub-application Ms. It is to be noted that the transmission/reception of the various types of information is enabled through wireless communication carried out by the short-range wireless communication interface unit 15 at the in-vehicle device 1 and the short-range wireless communication interface unit 25 at the portable terminal 2.

When the sub-application Ma is currently executed in the foreground by the control unit 20, the sub-application Ma generates a menu screen image that will allow the user to select an application he wishes to have executed by the launch function explained earlier. If, on the other hand, an application A is currently being executed in the foreground by the control unit 20, the application A generates a specific image and sound by utilizing, as needed, the traveling information or the operation information transferred from the sub-application Ms. The image and the sound are then stored into an image/audio memory 206 on a temporary basis, before they are output to an HDMI driver 207.

The HDMI driver 207 executes processing for converting an image and sound generated by the sub-application Ma, application A or the like to a video signal and an audio signal through a method in compliance with the HDMI standard. The video signal and the audio signal resulting from the conversion are then output by the video/audio signal output unit 26 to in-vehicle device 1 via the video/audio cable 3.

The portable terminal 2 has a software structure as described above. It is to be noted that the software structure may be achieved by using, for instance, the Android (registered trademark) operating system. In the software configured in the Android operating system, the sub-application Ma will be executed in the "Activity" thread and the sub-application Ma will be executed in the "Service" thread so as to enable execution of the sub-application Ma in the foreground by the control unit 20 concurrently with the sub-application Ms, being executed in the background.

Next, operations that will occur when a touch operation is performed by the user at the in-vehicle device 1 are explained in detail. As described earlier, when a touch operation is performed by the user on the screen that is brought up on display on the display unit 11 of the in-vehicle device 1, operation information corresponding to the touch position specified by the touch operation is transmitted from the in-vehicle device 1 to the portable terminal 2. On this occasion, the in-vehicle device 1 uses a communication format for a mouse, called HID packet, for transmitting the operation information to the portable terminal 2.

It is to be noted that the HID packet, which is a communication format for a mouse used in Bluetooth, are generally used when a mouse is used as an input device of the portable terminal 2. When the mouse is used, according to the HID packet, displacement quantity information corresponding to the movement of the mouse and button operation information corresponding to various types of button operations, for instance, a click operation in a predetermined format can be transmitted from the mouse to the portable terminal 2 at predetermined time intervals. Upon receipt of these pieces of information transmitted from the mouse via the HID packet, the portable terminal 2 performs reception processing through the HID profile 205 shown in FIG. 3 and the OS 203 reads the received information to detect the movement of the mouse and causes the cursor on the screen to be displaced in correspondence to the detected movement of the mouse. In addition, when a button operation such as click or the like is performed, the OS 203 reads the content of the operation that is performed by the user on the screen based upon the content of the screen corresponding to the cursor position at that time and the content of the button operation. At the control unit 20, an application corresponding to the icon specified on the menu screen in correspondence to the content of the operation of the mouse read by the OS 203 is started up or the processing corresponding to the operation specified on the screen of the application being executed is executed.

In the in-vehicle information system according to the present embodiment, the operation information corresponding to the touch operation at the in-vehicle device 1 is transmitted from the in-vehicle device 1 to the portable terminal 2 by using the HID packet as described above. Through this measure, the content of touch operation can be recognized by the OS 203 at the portable terminal 2, similarly to the case in which a mouse is used.

FIG. 4(*a*) and FIG. 4(*b*) are diagrams illustrating the operations of the in-vehicle device 1 and the portable terminal 2, respectively, when the touch operation is performed at the in-vehicle device 1. FIG. 4(*a*) illustrates the condition before the touch operation. In FIG. 4(*a*), arrow-shaped cursors 40 brought up on display at respective right lower ends of the outer peripheries of the display units 11 and 21, respectively, have each a tip portion of the arrow, a left upper end of which serves as a point of indication. In other words, before the touch operation, the cursor 40 on the screen indicates a reference position 41 located at a position accounting for the right lower end of the display unit 11 in the in-vehicle device 1 or a reference position 42 located at a position accounting for the right lower end of the display unit 21. It is to be noted that the most part of the cursor 40 is located outside the range of each screen display at the display units 11 and 21 and actually, it is not brought up on display. Therefore, in FIG. 4(*a*), the display position of the cursor 40 is shown in broken line.

Before the touch operation, the portable terminal 2 brings up at the display unit 21 a screen including the cursor 40 brought up on display at the reference position 42 and at the same time outputs video information of this screen to the in-vehicle device 1 via the video/audio cable 3 by using the video signal described above. When the in-vehicle device 1 receives the video information from the portable terminal 2, the in-vehicle device 1 brings up on display at the display unit 11 the same screen as that which is brought up on display at the display unit 21 of the portable terminal 2 based upon the video information. Through these measures, as shown in FIG. 4(*a*), the screen including the cursor 40 brought up on display at the reference position 41 is displayed at the display unit 11.

Here, as shown in FIG. 4(*a*), it is assumed that the resolution of the display unit 11 (number of pixels) in the X direction (transverse direction) is expressed as Xv, the resolution of the display unit 11 (number of pixels) in the Y direction (longitudinal direction) is expressed as Yv. It is also assumed that the resolution of the display unit 21 (number of pixels) in the X direction (transverse direction) is expressed as Xs and the resolution of the display unit 21 (number of pixels) in the Y direction (longitudinal direction) is expressed as Ys. The information about these resolutions is stored in advance in the memory units 14 and 24 at the in-vehicle device 1 and the portable terminal 2, respectively.

FIG. 4(*b*) shows the condition when a touch operation is performed. It is assumed that as shown in FIG. 4(*b*), the user performs the touch operation to the in-vehicle device 1 by touching the display unit 11 with his finger and specifies a touch position 43. When the in-vehicle device 1 detects this touch operation, it calculates a displacement quantity Px in the X direction and a displacement quantity Py in the Y direction, as quantities of displacement ranging from the reference position 41, which was indicated by the cursor 40 before the touch operation, to the touch position 43. The displacement quantities Px and Py can be calculated by, for instance, counting the number of pixels existing between the reference position 41 and the touch position 43 in the X direction and in the Y direction, respectively. In this case, when it is assumed that the left upper end of the display unit 11 is defined to be a start point, the rightward orientation is defined to be a positive orientation of the X direction, and the downward orientation is defined to be a positive orientation of the Y direction, both the displacement quantities Px and Py between the reference position 41 and the touch position 43 are obtained as negative values.

After the displacement quantity Px in the X direction and the displacement quantity Py in the Y direction are calculated as described above, the in-vehicle device 1 subsequently converts the displacement quantities Px and Py into displacement quantities Qx and Qy, respectively, on the display unit 21 of the portable terminal 2. This conversion of displacement quantities is performed based upon the resolutions Xv, Yv and the resolutions Xx, Ys described above according to the following expression (1).

$$Qx=PxX(Xs/Xv), Qy=PyX(Ys/Yv) \quad (1)$$

In the expression (1) above, Xs/Xv and Ys/Yv are conversion coefficients used when the displacement quantities Px and Py are converted into the displacement quantities Qx and Qy, respectively. The in-vehicle device 1 is enabled to obtain these conversion coefficients by obtaining the resolutions Xs and Ys of the display unit 21 from the portable terminal 2 in advance.

Once the displacement quantities Qx and Qy after the conversion are calculated, the in-vehicle device 1 transmits displacement quantity information indicating the displacement quantities Qx and Qy, as the first operation information in response to the touch operation, to the portable terminal 2 according to the HID packet. In the following explanation, the first operation information is referred to as "Move".

Figure 4A:
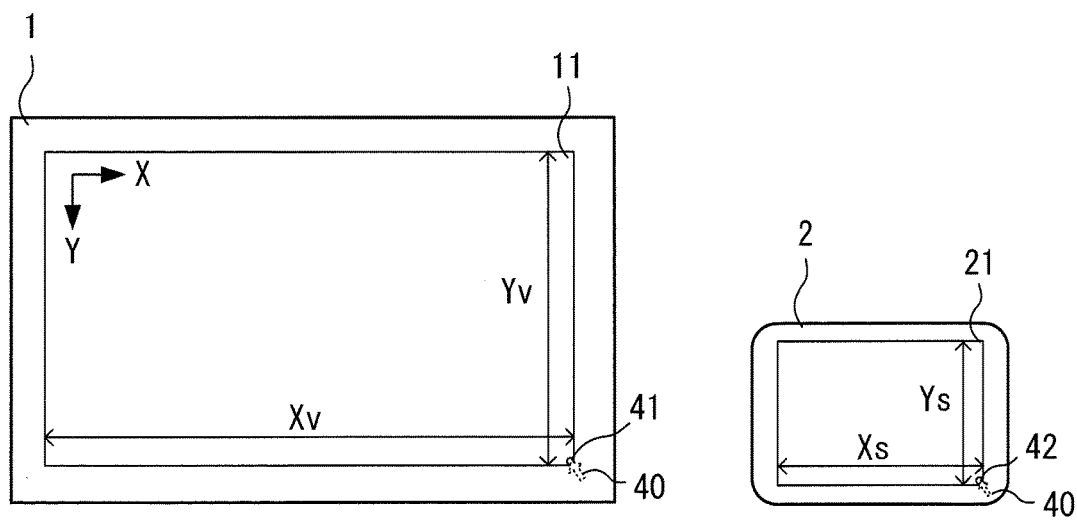
FIGS. 4A and 4B A diagram illustrating the behaviors of the in-vehicle device and the portable terminal, respectively, when a touch operation is performed at the in-vehicle device.
Figure 4B:
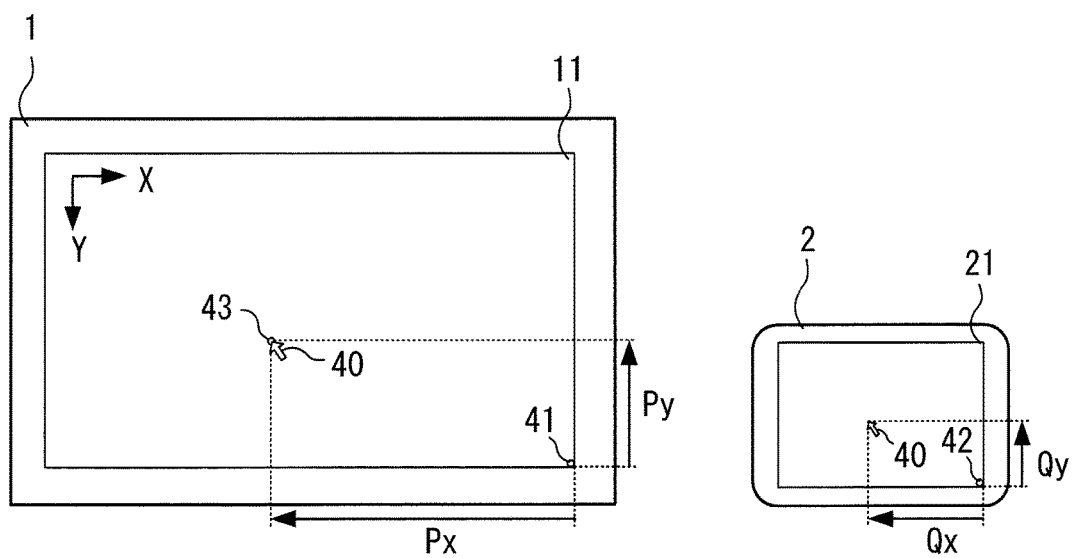

When the portable terminal 2 receives the above mentioned operation information "Move" from the in-vehicle device 1, it causes the displacement quantities Qx and Qy to be read based upon the received operation information by the OS 203. Then, as shown in FIG. 4(b), it brings up on display, at the display unit 21, the cursor 40 as being displaced by the displacement quantities Qx and Qy from the reference position 42 located at the right lower end at the display unit 21 and at the same time outputs video information of the screen including the cursor 40 thus displaced to the in-vehicle device 1 via the video/audio cable 3 by using the video signal described above.

When the in-vehicle device 1 receives the video information about the screen including the cursor 40 after the displacement from the portable terminal 2, it brings up on display the same screen as that brought up on display at the display unit 21 of the portable terminal 2 at the display unit 11 based upon the received video information. As a result, the screen in which the cursor 40 specifies the touch position 43 is brought up on display at the display unit 11 as shown in FIG. 4(b).

After having transmitted the operation information "Move", the in-vehicle device 1 transmits button operation information indicating that a predetermined button operation, for instance, a left click operation has been performed, as the second operation information in response to the touch operation, to the portable terminal 2 through the HID packet. In the following explanation, the second operation information is referred to as "Tap". On this occasion, in case of the operation information "Tap", displacement quantity information indicating that the displacement quantities of the cursor 40 are 0 is also transmitted as well as the button operation information.

Upon receipt of the operation information "Tap" from the in-vehicle device 1, the portable terminal 2 causes the content of the button operation that is indicated by the button operation information to be read based upon the received operation information "Tap" by the OS 203. Then, for instance, startup of the application corresponding to the icon at the touch position 43 is performed in correspondence to the content of the screen brought up on display at the display position, that is, the touch position 43, of the cursor 40 after the displacement specified by the operation information "Move" and the content of the button operation specified by the operation information "Tap".

When the user performs a release operation for disengaging the finger from the display unit 11 of the in-vehicle device 1 to terminate the touch operation, the in-vehicle device 1 transmits, as third operation information in response to the touch operation, button operation information representing that the button operation specified by the operation information "Tap" is cancelled to the portable terminal 2 according to the HID packet. In the following explanation, this operation information is referred to as "Untap". In case of the operation information "Untap", like the above-mentioned operation information "Tap", displacement quantity information representing that the displacement quantities of the cursor 40 are 0 is also transmitted as well as the button operation information.

After the transmission of the operation information "Untap", the in-vehicle device 1 transmits, as fourth operation information in response to the touch operation, operation information for returning the display position of the cursor 40 from the touch position 43 to the reference position 41 to the portable terminal 2 according to the HID packet. Hereinafter, this operation information is referred to as "Move_Reset".

It is preferred that the in-vehicle device 1 transmits displacement quantity information representing a displacement quantity that is equal to or larger than the displacement quantity from the touch position 43 to the reference position 41 as the above-mentioned operation information "Move_Reset" to the portable terminal 2. For instance, assuming that as described above, the rightward orientation is a positive orientation in the X direction and the downward orientation is a positive orientation of the Y direction, any displacement quantities that are equal to or larger than the resolution (number of pixels) of the display unit 11 (for instance, maximum displacement quantities that can be expressed by the displacement quantity information) are set in advance as displacement quantities relative to the reference position 41 for the X direction and the Y direction, respectively. By transmitting the displacement quantity information corresponding to these displacement quantities, the operation information "Move_Reset" can be transmitted. Alternatively, displacement quantities with reversed signs, −Qx, −Qy, obtained by reversing the signs of the displacement quantities Qx, Qy calculated according to the formula (1) above may be transmitted as the operation information "Move_Reset". In another way, displacement information that indicates any displacement quantities equal to or larger than the displacement quantities of from the touch position 43 to the reference position 41 may be transmitted as the operation information "Move_Reset".

Upon receipt of such displacement information as the operation information "Move_Reset" from the in-vehicle device 1, based on this, the portable terminal 2 causes the OS 203 to read the displacement quantities represented by the displacement information. Then, the portable terminal 2 causes the cursor 40 to be brought on display as being displaced to the reference position 42 located at the right lower end at the display unit 21 and at the same time outputs video information of the screen including the cursor 40 thus displaced to the in-vehicle device 1 via the video/audio cable 3 by using the video signal described above.

When the in-vehicle device 1 receives the video information about the screen including the cursor 40 after the displacement from the portable terminal 2, it brings up on display the same screen as that brought up on display at the display unit 21 of the portable terminal 2 at the display unit 11 based upon the received video information. As a result, the screen as shown in FIG. 4(a) is brought up on display at the display unit 11.

As explained above, when the user performs touch operations to the in-vehicle device 1, each type of operation information "Move", "Tap", "Untap", or "Move_Reset" is sequentially transmitted in response to the touch operations done by the user. This allows the portable terminal 2 to determine the touch operation by the user and execute appropriate processing corresponding to it.

Next, explanation is made on elimination of malfunction in continuous touch operation at the in-vehicle device 1. It is known that in case of mouse operation utilizing the HID packet, if operation information representing displacement quantities equal to or larger than a predetermined distance is continuously input within a predetermined time, an operation called acceleration operation is performed. This acceleration operation is intended to allow the cursor to move to a desired position with a relatively small amount of operation by adding displacement quantities larger than the displacement quantities that are actually input.

However, in the in-vehicle information system according to the present embodiment, the above-described touch operation is realized by transmitting operation information in response to the touch operation from the in-vehicle device 1 to the portable terminal 2 according to the HID packet. With this configuration, if the acceleration operation is performed at the portable terminal 2, the cursor will move to a position that is different from the actual touch position, resulting in a failure to determine the touch operation correctly.

Thus, if the user performs touch operations continuously within a short time, the in-vehicle device 1 does not immediately transmit operation information in response to the second and subsequent operations but defer their transmission by a predetermined interval time. This eliminates input of operation information from the in-vehicle device 1 a plurality of times continuously to disallow acceleration processing to be executed at the portable terminal 2.

If a multiple touch operations are performed continuously within the interval time, the pieces of operation information in response to the second and subsequent touch operations, respectively, are accumulated with sequential delays and it may be often the case that the total sum of delay time becomes a significant amount. Consequently, to avoid such an inconvenience, it is preferred to limit the number of times of touch operations for which transmission of the operation information is to be delayed to a predetermined number of times, for instance, 5 times, and cancel a number of touch operations, which number exceeds the predetermined number and disallows transmission of operation information relative to the cancelled touch operations. Alternatively, it may be configured to set an upper limit to the delay time and cancel touch operations that are input in a time outside the upper limit to disallow transmission of the operation information relative to the cancelled operations.

In addition, in the above-mentioned processing, it sometimes the case that the interval time necessary for eliminating the execution of the acceleration processing is not always constant and may vary depending on the type and version of the OS 203 mounted on the portable terminal 2. Accordingly, it is preferred that the in-vehicle device 1 is configured to acquire the information about the interval time from the portable terminal 2 in advance and set an optimal interval time based on the acquired information. For instance, respective interval times corresponding to various types and versions of the OS are recorded in a predetermined server device in advance. Then, information about the interval time corresponding to the OS 203 is delivered from the server device to the portable terminal 2. The portable terminal 2 notifies the interval time to the in-vehicle device 1 based on the information delivered from the server device. This allows the optimal interval time for the OS 203 mounted on the portable terminal 2 to be acquired at the in-vehicle device 1.

Figure 5:
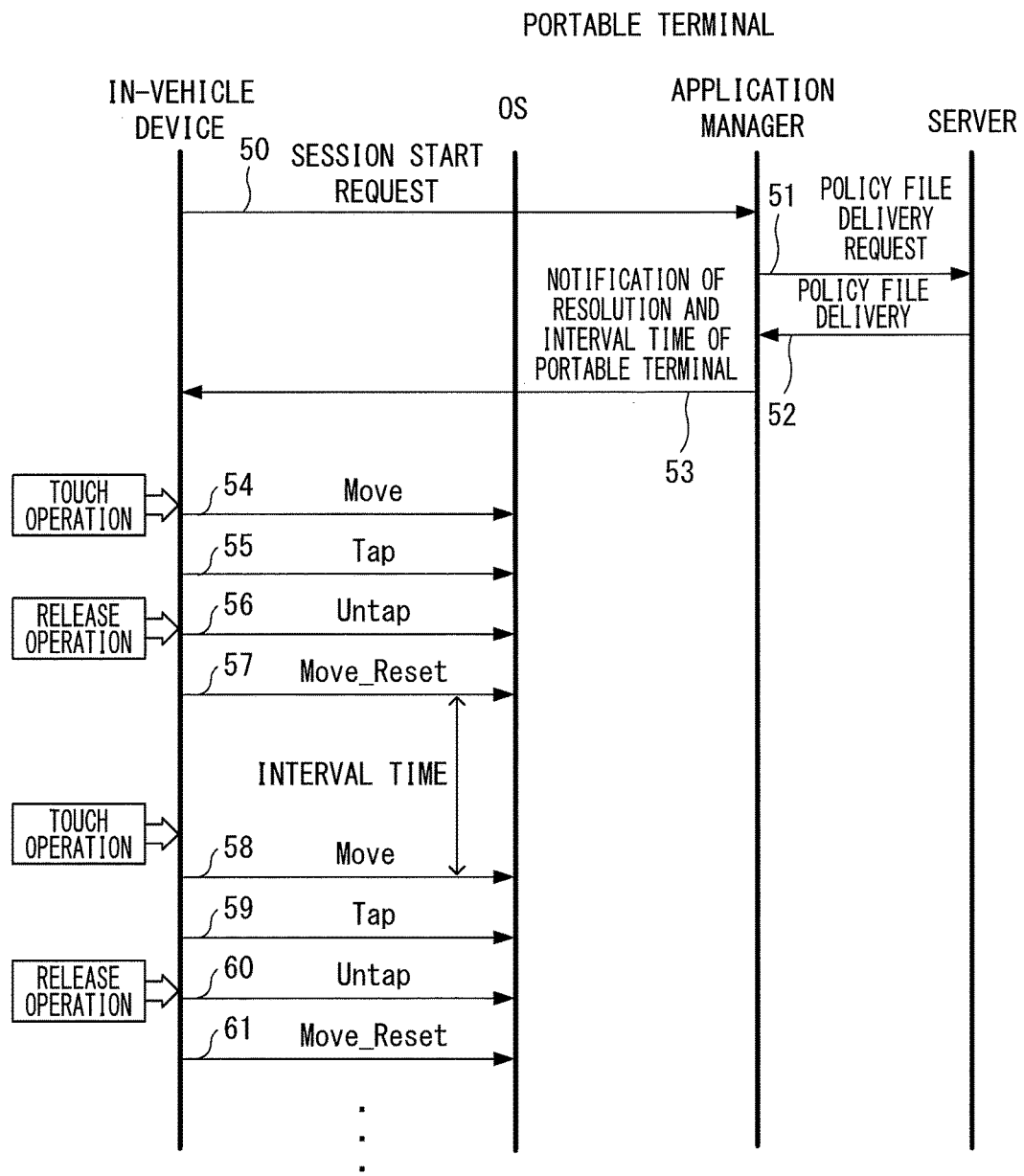
FIG. 5 A flowchart illustrating the processing executed in the in-vehicle device when the touch operation is performed.

FIG. 5 is a sequence diagram illustrating the flow of information among the in-vehicle device 1, the portable terminal 2, and the server device.

Upon connection of the in-vehicle 1 and the portable terminal 2, the in-vehicle device 1 outputs a session start request indicated by reference numeral 50 to the application manager 201 shown in FIG. 3 that is executed at the portable terminal 2. Upon receipt of the session start request, the portable terminal 2 is connected to the server device via a wireless communication network using the wireless communication unit 27 by a subapplication Ma of the application manger 201. Then, the portable terminal 2 sends a request for delivery of a policy file as indicated by reference numeral 51. On this occasion, the subapplication Ma notifies, as information necessary for identifying the policy file, information such as, for instance, information about various applications stored at the memory unit 24, information about model of the portable terminal 2, and information about type and version of the OS 203 mounted on the portable terminal 2 to the server device.

Upon receipt of the request for delivery of the policy file from the subapplication Ma of the portable terminal 2, the server device selects a policy file suited for the portable terminal 2 out of various types of policy files that are stored at advance and delivers it to the portable terminal 2 as indicated by reference numeral 52. The server device individually stores policy files for various information terminals, including interval time information for each type or version of the OS, resolution information for each model, and regulation information for various applications. The server device selects a policy file that is optimal to the portable terminal 2 from among the policy files and delivers the selected policy file to the portable terminal 2 via a wireless communication network such as telephone line network or the Internet network.

FIG. 6 is a diagram showing an example of the information recorded in the policy file delivered to the portable terminal 2. As shown in FIG. 6, the policy file records regulation information, resolution information and the interval time information relative to the portable terminal 2. The regulation information represents the contents of regulation on operations of each application stored at the portable terminal 2 during a travel of the vehicle. In the example shown in FIG. 6, the regulation information allows the application A to perform both display of images and input operation by the user. It allows the application B to display images and disallows the application B to input operation by the user. It disallows the application C to perform both display of images and input operation by the user. The resolution information represents resolution of the screen in the transverse direction (X direction) and the longitudinal direction (Y direction) of the display unit 21. In the example of FIG. 6, the resolution in the transverse direction is 1280 pixels and the resolution in the longitudinal direction is 640 pixels. The interval time information represents interval time necessary for the OS 203. In the example shown in FIG. 6, the interval time is 100 ms.

Upon receipt of the policy file delivered from the server device, the portable terminal 2 causes the policy file to be stored at the memory 24 by the subapplication Ma of the application manage 201. The portable terminal 2 causes the policy file to be read from the memory 24 by the subapplication Ms and causes the short-range wireless communication interface unit 25 to notify resolution and interval time to the in-vehicle device 1 as indicated by reference numeral 53. In this example, the contents of these are notified to the in-vehicle device 1 by transmitting the resolution information and the interval time information indicated in the received policy file.

Upon receipt of the notification of the resolution and the interval time from the portable terminal 2, the in-vehicle device 1 calculates conversion coefficients to be used in the formula (1) above based on the notified resolution. The in-vehicle device 1 sets an interval time for eliminating the execution of acceleration processing based on the notified interval time.

If the user performs a touch operation to the in-vehicle device 1, the in-vehicle device 1 calculates displacement quantities after conversion corresponding to the touch position using the conversion coefficients, and first operation information "Move" to the OS 203 of the portable terminal 2 as indicated by reference numeral 54. Thereafter, in-vehicle device 1 transmits second operation information "Tap" to the OS 203 of the portable terminal 2 as indicated by reference numeral 55.

If the user performs a release operation to terminate the touch operation after the operation information "Tap" is transmitted, the in-vehicle device 1 transmits third operation information "Untap" to the OS 203 of the portable terminal 2 as indicated by reference numeral 56. Thereafter, the in-vehicle device 1 transmits fourth operation information "Move_Reset" to return the cursor that is moved to the touch position to the original position as indicated by reference numeral 57.

After the release operation, if the user performs touch operations continuously within the interval time, the in-vehicle device 1 calculates displacement quantities corresponding to the touch positions and then is on standby. In this case, the standby time is time from the moment at which the operation information "Move_Reset" is transmitted in response to the release operation for the previous touch operation to the moment at which the interval time e elapses. After the interval time elapsed, the in-vehicle device 1 continuously transmits the operation information "Move" and the operation information "Tap" to the OS 203 of the portable terminal 2 as indicated by reference numerals 58 and 59, respectively. Thereafter, if the user performs a release operation to terminate the touch operation, the in-vehicle device 1 continuously transmits the operation information "Untap" and the operation information "Move_Reset" to the OS 203 as indicated by reference numerals 60 and 61, respectively. Subsequently, similar operations as above are repeated.

As explained above, each time when the user performs the touch operation and the release operation, respective types of operation information are continuously transmitted from the in-vehicle device 1 to the portable terminal 2 in a predetermined order. In case the touch operations are continuously performed within the interval time, transmission of operation information corresponding to later touch operations in a delay ensures transmission interval that is equal to or longer than the interval time between two adjacent touch operations. The portable terminal 2 reads each piece of operation information from the in-vehicle device 1 at the OS 203 to be able to determine the content of the touch operation performed by the user to the in-vehicle device 1.

Figure 7:
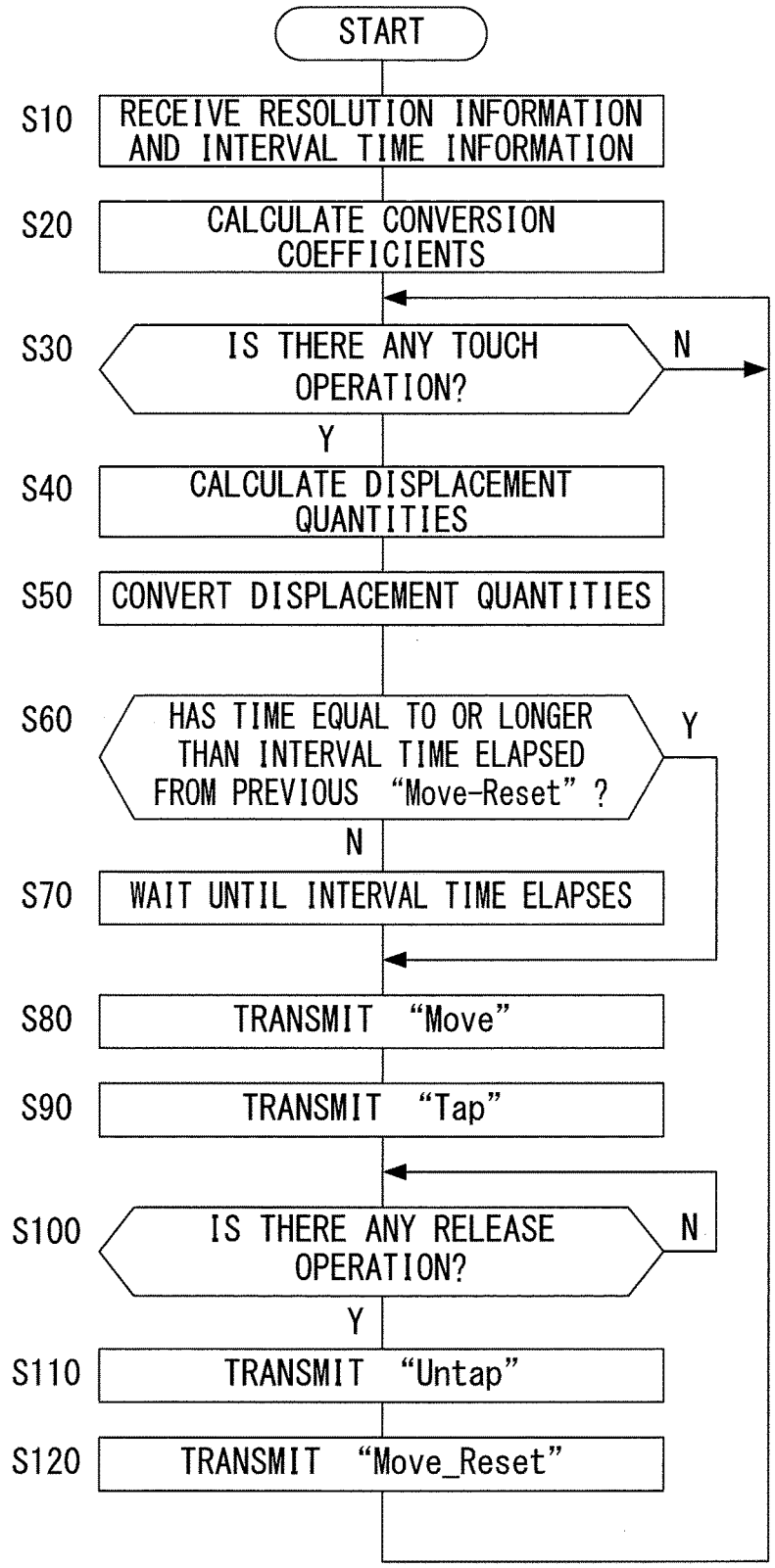
FIG. 7 A flowchart of processing relating to the touch operation executed at the in-vehicle device.

FIG. 7 is a flowchart of processing relating to the touch operation executed at the in-vehicle device 1. The processing illustrated in this flowchart is executed by the control unit 10 when communication is established between the in-vehicle device 1 and the portable terminal 2.

In step S10, the control unit 10 receives the resolution information of the display unit 21 and the interval time information transmitted from the portable terminal 2 by using the short-range wireless communication interface unit 15. In this step, as described earlier, the control unit 10 receives the resolution Xs in the X direction of the display unit 21 and the resolution Ys in the Y direction of the display unit 21 as the resolution information from the portable terminal 2. In addition, the control unit 10 receives information representing the length of time necessary for eliminating execution of acceleration processing at the OS 203, for instance, an interval time of 100 ms as the interval time information from the portable terminal 2.

In step S20, the control unit 10 calculates a conversion coefficient in correspondence to a ratio of the resolution of the display unit 21 to the resolution of the display unit 11 based upon the resolution information of the display unit 21 received from the portable terminal 2 in step S10 and the resolution of the display unit 11 stored at the memory unit 14 in advance. In this step, as shown in the expression (1) described above, the resolutions Xs and Ys of the display unit 21 shown in the resolution information received in step S10 are divided by the resolution Xv of the display device 11 in the X direction and the resolution Yv of the display unit 11 in the Y direction, respectively, to calculate a conversion coefficient in the X direction, Xx/Xv and a conversion coefficient in the Y direction, Ys/Yv, respectively.

In step S30, the control unit 10 makes a decision as to whether a touch operation has been performed by the user to the operation unit 12, which is a touch panel switch that is integrally constituted with the display unit 11. If a touch operation has been performed, the control unit 10 detects the touch operation and the operation proceeds to step S40.

In step S40, the control 10 calculates displacement quantities from the display position of the cursor when the touch operation was detected in step S30 to the touch position specified by that touch operation. In this step, as described earlier, the control unit 10 calculates the displacement quantity in the X direction, Px, and the displacement quantity in the Y direction, Py, as the displacement quantities from the reference position 41 at the right lower end to the touch position 43.

In step S50, the control unit 10 converts the displacement quantities calculated in step S40 into displacement quantities on the display unit 21 at the portable terminal 2. In this step, the control unit 10 converts the displacement quantity in the X direction, Px, and the displacement quantity in the Y direction, Py, calculated relative to the display unit 11 into the displacement quantities in the X direction, Qx, and the displacement quantity in the Y direction, Qy on the display unit 21 according to the expression (1) described above by using the conversion coefficient in the X direction, Xs/Xv, and the conversion coefficient in the Y direction, Ys/Yv, that have been calculated in step S20.

In step S60, the control unit 10 makes a decision as to whether time equal to or longer than the interval time has elapsed from the transmission of the previous operation information "Move_Reset". In this step, comparison is made between the time elapsed from the transmission of the operation information "Move_Reset" in step S120, which is described later, executed in response to the previous touch operation and an interval time that is set based on the interval time information received in step S10. As a result, if the elapsed time is shorter than the interval time, the operation proceeds to step S70, whereas if the elapsed time is equal to or longer than the interval time, the operation proceeds to step S80.

In step S70, the control unit 10 is on standby until the elapsed time from the transmission of the previous operation information "Move_Reset" reaches the interval time. This delays execution of the processing in next step S80 to delay the transmission of the operation information "Move". When the interval time has elapsed, the operation proceeds to step S80.

In step S80, the control unit 10 transmits the operation information "Move" to the portable terminal 2. In this step, the control unit 10 transmits to the portable terminal 2 the displacement quantity information representing the displacement quantities converted in step S50 by using the short-range wireless communication interface unit 15. As a result, displacement quantity information in correspondence to the displacement quantities from the display position of the cursor at the time of the touch operation to the detected touch position is transmitted from the in-vehicle device 1 to the portable terminal 2. Transmission of the displacement quantity information is performed by using the HID packet, which is a communication format for a mouse as described above. The displacement quantity information transmitted from the in-vehicle device 1 is received by the short-range wireless communication interface unit 25 at the portable terminal 2 and read by the OS 203. As a result, the cursor position on the screen is displaced at the portable terminal 2 and the video information including the cursor after the displacement is transmitted from the portable terminal 2 to the in-vehicle device 1 and brought up on display on the display unit 11.

In step S90, the control unit 10 transmits the operation information "Tap" to the portable terminal 2. In this step, the control unit 10 transmits displacement quantity information representing that both the displacement quantities in the X direction and the Y direction are 0 and the button operation information representing that a predetermined button operation such as a left click operation has been performed to the portable terminal 2 by using the short-range wireless communication interface unit 15.

In step S100, the control unit 10 makes a decision as to whether a release operation has been performed by the user to the operation unit 12, which is integrally constituted with the display unit 11. If the release operation is performed, that is, if the touch operation detected in step S30 is completed, the operation proceeds to step S110.

In step S110, the control unit 10 transmits the operation information "Untap" to the portable terminal 2. In this step, the control unit 10 transmits displacement quantity information representing that both the displacement quantities in the X direction and the Y direction are 0 and the button operation information representing that the button operation has been cancelled as the operation information "Untap" to the portable terminal 2 by using the short-range wireless communication interface unit 15.

In step S120, the control unit 10 transmits the operation information "Move_Reset" to the portable terminal 2. In this steep, the control unit 10 transmits displacement quantity information such as the one described above that is set according to the displacement quantities up to the reference position as the operation information "Move_Reset" to the portable terminal 2 by using the short-range wireless communication interface unit 15.

After the execution of step S120, the control unit 10 causes the operation to return to step S30 and repeatedly execute the above-mentioned processing in response to the touch operation by the user.

According to the embodiment of the present invention explained above, the following operation and advantageous effects can be obtained.

(1) The in-vehicle device 1 receives video information about a screen containing the cursor 40 from the portable terminal 2 via the video/audio signal input unit 16 and brings up the screen on display at the display unit 11, which is a touch panel. Then, it detects the touch position specified by the touch operation by the user by using the operation unit 12 that constitutes the touch panel together with the display unit 11 and transmits operation information in response to the touch operation through the processing by the control unit 10 by using the short-range wireless communication interface unit 15 to the portable terminal 2 (steps S80 to S120). If the touch operations are performed continuously, transmission of the operation information is delayed by waiting until the interval time elapses (step S70). This enables elimination of the execution of acceleration processing at the portable terminal 2. Thus, when the display screen of the portable terminal 2 to which touch panel operation is applied is brought up on display at the in-vehicle device 1, the portable terminal 2 can be operated through the in-vehicle device 1.

(2) When the touch position 43 is specified by the touch operation by the user in step S80, the control unit 10 transmits the operation information "Move" for displacing the cursor 40 from the reference position 41 to the touch position 43. If the specifying of the touch position 43 is cancelled after the operation information "Move" is transmitted, the control unit 10, in step S120, transmits the operation information "Move_Reset" for returning the cursor 40 from the touch position 43 to the reference position 41. If after the transmission of the operation information "Move_Rest", a next touch operation is performed within a predetermined interval time, the control unit 10 waits until the interval time elapses and then executes the processing in step S80 to transmit the operation information "Move_Reset in a delay. This ensures elimination of the execution of acceleration processing at the portable terminal 2 if the touch operations are performed continuously within the interval time.

(3) In step S80, the control unit 10 transmits the displacement quantity information according to the distance from the reference position 41 to the touch position 43 as the operation information "Move", whereas in step S120, the control device 10 transmits the predetermined displacement quantity information relative to the reference position 41 as the operation information "Move_Reset". This enables the display position of the cursor 40 to be returned to the original reference position 41 without fail every time when the touch operation is completed. As a result, when the display screen of the portable terminal 2 to which the touch panel operation is applied is brought up on display at the in-vehicle device 1, the portable terminal 2 can be appropriately operated through the in-vehicle device 1 instead of any possible difference in resolution between the display unit 11 of the in-vehicle device 1 and the display unit 21 of the portable terminal 2, which difference in resolution may cause an error in the position of the cursor, without accumulation of such errors.

(4) If the touch position 43 is specified by the touch operation by the user, the control unit 10, in step S90, transmits the operation information "Tap" after the operation information "Move" is transmitted in step S80. If the specifying of the touch position 43 is cancelled after the operation information is transmitted, the control unit 10, in step S110, transmits the operation information "Untap" indicating cancellation of the button operation. Then, the control unit 10 transmits the operation information "Move_Reset" in step S120. This allows the determination of the content of the touch operation performed by the user at the portable terminal 2 to the in-vehicle device 1 without fail.

(5) The control unit 10 sets the displacement quantities of the cursor 40 in the operation information "Tap" and "Untap" at 0. This enables icon or the like corresponding to the touch position 43 specified by the touch operation by the user to be certainly selected at the portable terminal 2 and appropriate processing to be executed according to the result of the selection.

(6) The in-vehicle device 1 acquires interval time information about interval time from the portable terminal 2 by using the short-range wireless communication interface unit 15 through the processing executed by the control unit 10 (step S10). By the decision processing performed in step S60 based on the interval time information, the control unit 10 determines whether to execute the processing in step S70. Based on the result of this decision, the control unit 10 determines whether to delay transmission of the operation information "Move" in next step S80. This configuration enables appropriate interval time to be set for the OS 203 mounted on the portable terminal 2 and also enables determination whether to delay the transmission of operation information.

(7) In step S10, the interval time information is transmitted from the portable terminal 2 based on a policy file delivered from the predetermined server device to the portable terminal 2. Consequently, it is possible to notify optimal interval time according to any possible difference in type and version of the OS 203 mounted on the portable terminal 2 from the portable terminal 2 to the in-vehicle device 1 to allow interval time to be set at the in-vehicle device 1.

(8) The control unit 10 is configured to transmit various types of operation information by using the HID packet, which is a communication format for a mouse in Bluetooth by using the short-range wireless communication interface unit 15 in steps S80, S90, S110, and S120. Through these measures, the transmission of the displacement quantity information can be achieved readily and with certainty by using the existing communication format.

Second Embodiment

Next, a second embodiment of the present invention is explained. In the first embodiment mentioned above, explanation is made on the example in which when the user performs a touch operation to specify any desired position on the screen of the in-vehicle device 1, the in-vehicle device 1 transmits the operation information in response to the touch operation to the portable terminal 2 according to the HID packet to operate the portable terminal 2 through the in-vehicle device 1. In contrast, according to the second embodiment, explanation is made on a touch operation called a flick operation. In this operation, the touch position is quickly displaced in a predetermined direction in a flicking manner.

Figure 8:
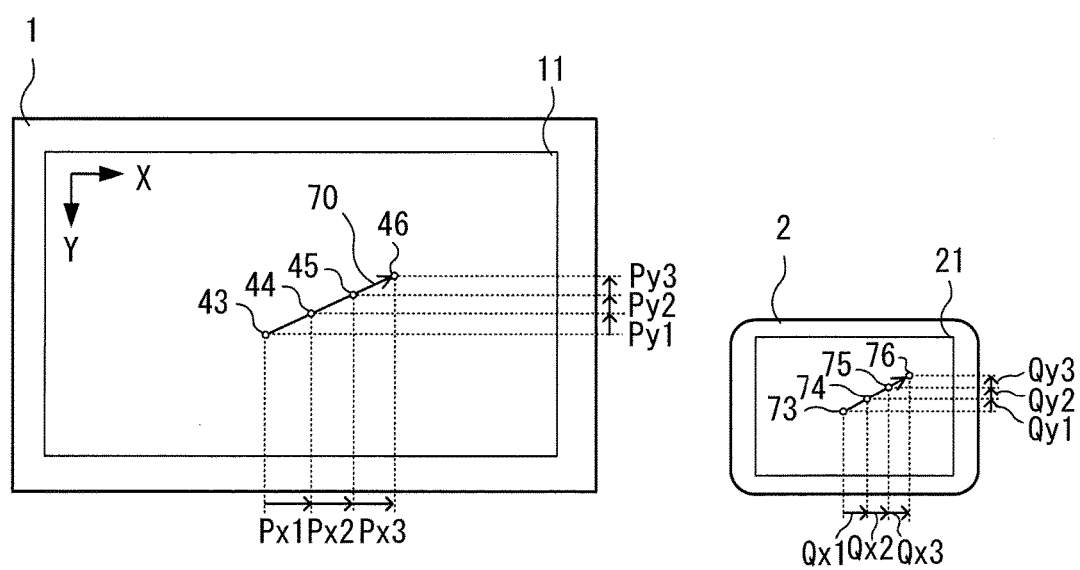
FIG. 8 A drawing illustrating the operations of the in-vehicle device and the portable terminal when a flick operation is performed at the in-vehicle device FIG. 9 A sequence diagram illustrating the flow of information among the in-vehicle device, the portable terminal, and the server device.

FIG. 8 is a drawing illustrating the operations of the in-vehicle device 1 and the portable terminal 2 when a flick operation is performed at the in-vehicle device 1. It is assumed that as shown in FIG. 8, the user performs a flick operation by touching the display unit 11 with a finger to specify the touch position 43 at the in-vehicle device 1 and subsequently quickly moving the finger in the direction of an arrow 70 to displace the touch position. If the in-vehicle device 1 detects such a flick operation, it first transmits the operation information "Move" and "Tap" according to the first specified touch position 43 in the same manner as that in the first embodiment mentioned above.

Subsequently, the in-vehicle device 1 detects a next touch position 44 specified after displacement for a predetermined time along the direction of the arrow 70 from the first touch position 43. Then, the in-vehicle device 1 calculates the displacement quantity Px1 in the X direction and the displacement quantity Py1 in the Y direction as the displacement quantities from the touch position 43 to the touch position 44.

After calculation of the displacement quantities Px1, Py1 from the touch position 43 to the touch position 44 as described above, the in-vehicle device 1 converts the displacement quantities Px1 and Py1 into displacement quantities Qx1, Qy1 on the display unit 21 of the portable terminal 2 according to the formula (1) described above. Then, the in-vehicle device 1 transmits the button operation information similar to the operation information "Tap" and displacement information representing the displacement quantities Qx1, Qy1 after the conversion as fifth operation information, which differs from the four types of operation information explained for the first embodiment, to the portable terminal 2 by using the HID packet. In the following explanation, this operation information is referred to as "Flick".

During inputting by the user by flicking operation, the in-vehicle device 1 executes processing similar to the processing described above at predetermined time intervals. As a result, the displacement quantities Qx2, Qy2 after conversion in correspondence to the displacement quantities Px2, Py2 from the touch position 44 to the touch position 45 along the direction of the arrow 70 and the displacement quantities Qx3, Qy3 after conversion in correspondence to the displacement quantities Px3, Py3 from the touch position 45 to the touch position 46 along the direction of the arrow 70 along with the button operation information are transmitted as the operation information "Flick" from the in-vehicle device 1 to the portable terminal 2 at predetermined time intervals.

As explained above, the in-vehicle device 1 detects the touch positions 43 to 46 at predetermined time intervals out of the touch positions that are continuously specified along the direction of the arrow 70. Then, it calculates the dislocation quantities Px1 to Px3 in the X direction and the displacement quantities Py1 to Py3 in the Y direction, respectively, between any adjacent two touch positions. It transmits the operation information "Flick" including the dislocation quantities Qx1 to Qx3 in the X direction after conversion and the displacement quantities Qy1 to Qy3 in the Y direction after conversion in correspondence to the dislocation quantities Px1 to Px3 and Py1 to Py3, respectively, and the button operation information, to the portable terminal 2 at the predetermined intervals. By receiving the operation information "Flick", the portable terminal 2 can acquire, for positions 73 to 76 on the display unit 21 each corresponding to the touch positions 43 to 46 on the display unit 11 of the in-vehicle device 1 specified by the flick operation, dislocation quantities Qx1 to Qx3 in the X direction and the dislocation quantities Qy1 to Qy3 in the Y direction between any two adjacent touch positions.

In the in-vehicle device 1, the result of detection of the touch operation performed onto the display unit 11 is output from the operation unit 12, which constitutes the touch panel together with the display unit 11, to the control unit 10 at a predetermined output frequency. The output frequency of the result of detection of touch operations from the operation unit 12 is typically shorter than the transmission frequency of the HID packet used in the transmission of the operation information "Flick". Consequently, it is preferred that the control unit 10 will extract touch operations corresponding to the transmission frequency of the HID packet out of the results of detection of touch operations input at predetermined intervals and based on the extracted touch operations, the control unit 10 will generate the operation information "Flick" and transmit it. In this case, a portion of the functions of the operation unit 12 may be realized by using driver software that is executed at the control unit 10.

When the portable terminal 2 receives operation information "Flick" from the in-vehicle device 1, the portable terminal 2 reads the content of the flick operation through the operation of the OS 203 based on the received operation information. Then, depending on the content of the flick operation specified by the operation information "Flick", the portable terminal 2 performs, for instance, switch over of display of the menu screen or corresponding processing in the application that is in execution.

Thereafter, when the user performs a release operation by releasing the finger from the display unit 11 at the touch position 46 to terminate the flick operation, the in-vehicle device 1 transmits the operation information "Untap" and "Move_Reset" to the portable terminal 2 by using the HID packet in the same manner as that in the first embodiment.

As explained above, when the user performs a flick operation to the in-vehicle device 1, the in-vehicle device 1 sequentially transmits the operation information "Move", "Tap", "Flick", "Untap", and "Move_Reset" from the in-vehicle device 1 to the portable terminal 2. This enables determination of the flick operation by the user at the portable terminal 2 and execution of appropriate processing.

Figure 9:
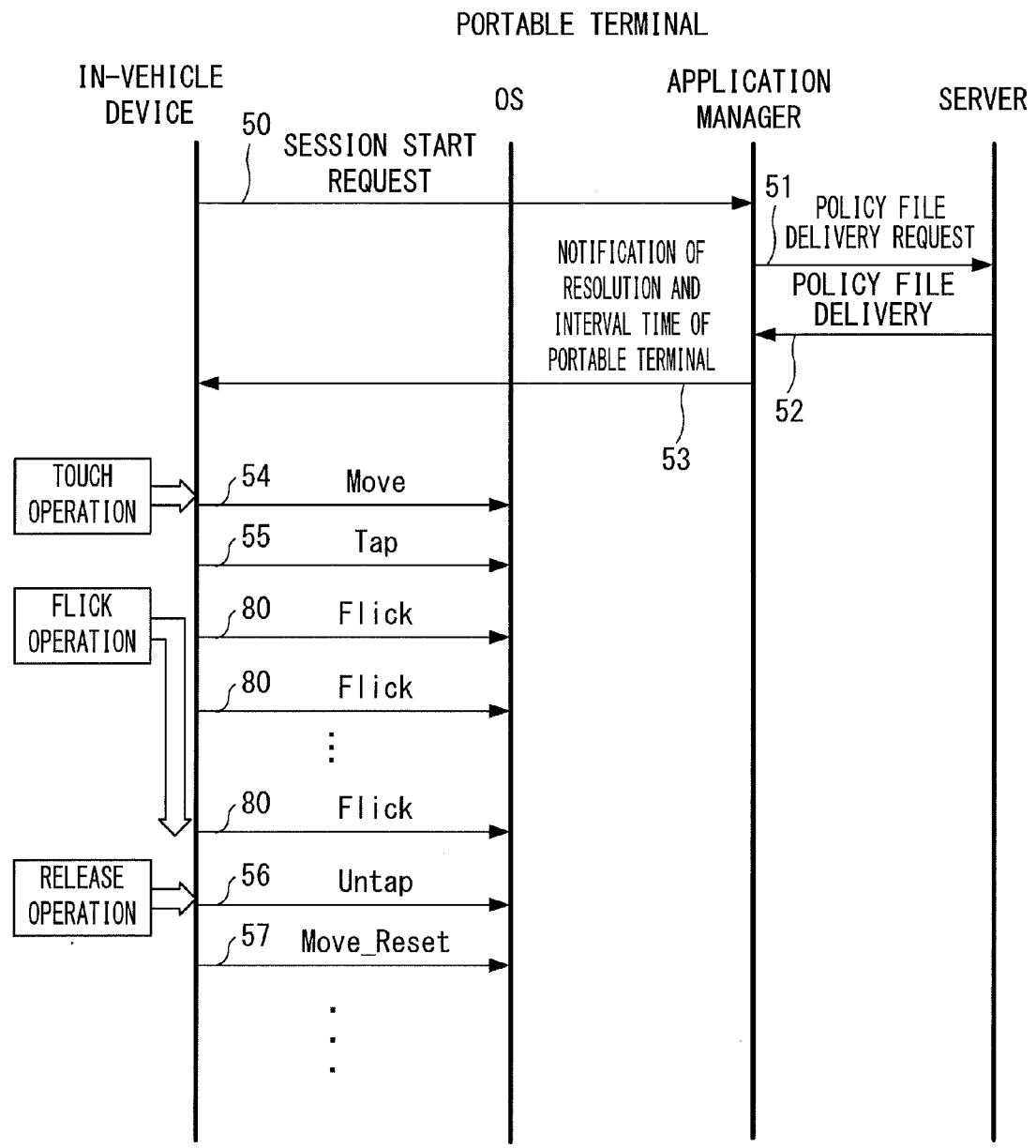

FIG. 9 is a sequence diagram illustrating the flow of information among the in-vehicle device 1, the portable terminal 2, and the server device.

When the in-vehicle device 1 and the portable terminal 2 are connected to each other, the in-vehicle device 1, the portable terminal 2, and the server device, respectively, perform operations indicated by reference numerals 50 to 53 in the same manner as that in the sequence diagram shown in FIG. 5 in the first embodiment. That is, when the in-vehicle device 1 outputs a session start request, the portable terminal 2 requests delivery of a policy file to the server device; the server device selects a policy file suitable for the portable terminal 2 and delivers the selected policy file to the portable terminal 2. Upon receipt of the policy file, the portable terminal 2 notifies the resolution and interval time to the in-vehicle device 1. Based on the resolution and interval time thus notified, the in-vehicle device 1 calculates the conversion coefficients in the formula (1) above and sets the interval time.

When the user performs a flick operation to the in-vehicle device 1, the in-vehicle device 1 calculates the displacement quantities after conversion in correspondence to the touch position at the time when the flick operation started in the same manner as that in the touch operation first explained according to the first embodiment. Then, the in-vehicle device 1 sequentially transmits the operation information "Move" and "Tap" as indicated by reference numerals 54 and 55. Thereafter, the in-vehicle device 1 transmits the operation information "Flick" corresponding to the displacement quantities of the touch position by the flick operation to the portable terminal 2 at predetermined time intervals as indicated by reference numeral 80. The transmission of the operation information "Flick" is performed continuously while the inputting by the flick operation is being performed.

When the user completes the flick operation and performs a release operation, the in-vehicle device 1 sequentially transmits the operation information "Untap" and the operation information "Move_Reset" as indicated by reference numeral 56 and 57 in the same manner as that in the first embodiment.

If the user performs touch operations continuously after the transmission of the operation information "Move_Reset", the in-vehicle device 1 waits until the interval time elapses in the same manner as in that in the first embodiment. If the interval time has elapsed, the in-vehicle device 1 repeats the operation in the same manner as that mentioned above.

As explained above, if the user performs a flick operation to the in-vehicle device 1, the operation information "Flick" including the predetermined button operation information and the displacement quantity information in correspondence to the displacement quantities of the touch position by this flick operation are transmitted from the in-vehicle device 1 to the portable terminal 2 at predetermined time intervals after the transmission of the operation information "Move" and "Tap". The portable terminal 2 reads the operation information "Flick" from the in-vehicle device 1 at the OS 203 to determine the flick operation that the user has performed to the in-vehicle device 1.

Figure 10:
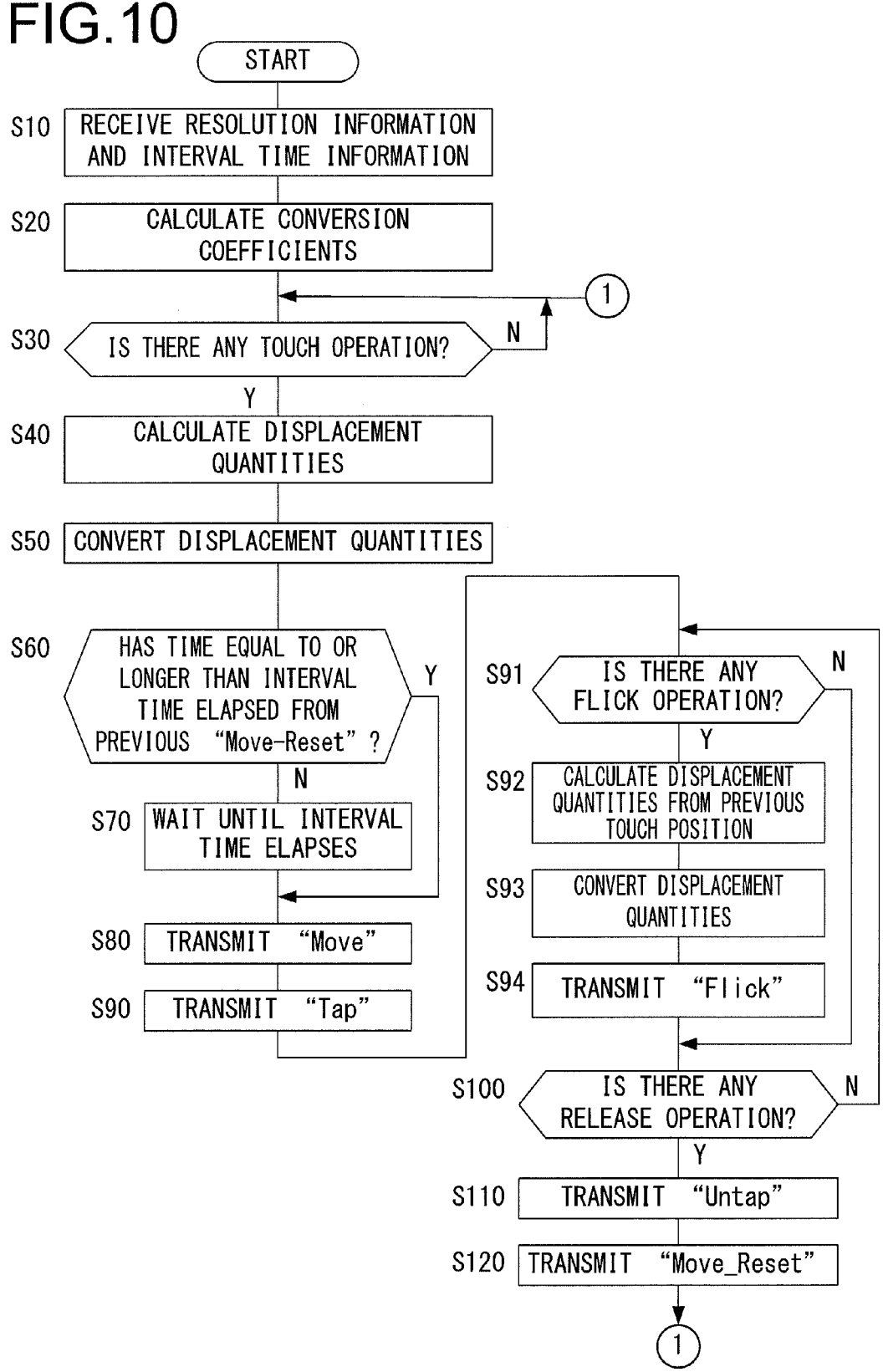
FIG. 10 A flowchart illustrating the processing relating to the flick operation executed at the in-vehicle device.

FIG. 10 is a flowchart illustrating the processing relating to the flick operation executed at the in-vehicle device 1. The processing shown in the flowchart is to be executed by the control unit 10 when communication is established between the in-vehicle device 1 and the portable terminal 2. In FIG. 10, the same step numbers as those in FIG. 7 explained in the first embodiment are assigned to the part of the processing having the same contents as those illustrated in the flowchart shown in FIG. 7. Hereafter, explanation is omitted for the processing having the same step numbers as those in FIG. 7 unless otherwise required specifically.

After transmission of the operation information "Tap" to the portable terminal 2 in step S90, the control unit 10, in step S91, makes a decision as to whether a flick operation has been performed by the user to the operation unit 12, which is a touch panel switch integrally constituted with the display unit 11. In this step, the control unit 10 makes a decision as to whether the touch position is changed from the position at which the touch operation is detected in step S30 to thereby make a decision as to whether a flick operation is present. As explained referring to FIG. 8, if the user performs a flick operation by quickly moving the finger in any desired direction, the touch position is changed accordingly. Consequently, if a change in touch position is detected, a decision is made that a flick operation has been performed and the operation proceeds to next step S92. If no flick operation has been detected, a decision is made that no flick operation has occurred and the operation proceeds to step S100.

In step S92, the control unit 10 calculates the displacement quantities based on the previous touch position. In this step, as mentioned earlier, during flick operation, continuously changing touch position is detected at predetermined time intervals and displacement quantities in the X direction and in the Y direction from the previously detected touch position to the current touch position are calculated.

In step S93, the control unit 10 converts the displacement quantities calculated in step S92 into displacement quantities on the display unit 21 of the portable terminal 2. In this step, in the same manner as that in step S50, the control unit 10 converts the displacement quantities in the X direction and the displacement quantities in the Y direction, respectively, according to the formula (1) above using the conversion coefficient $Xs/Xy$ in the X direction and the conversion coefficient $Ys/Yv$ in the Y direction calculated in step S20.

In step S94, the control unit 10 transmits the operation information "Flick" to the portable terminal 2. In this case, the control unit 10 transmits displacement quantity information representing the displacement quantities converted in step S93 and the button operation information representing that a predetermined button operation such as a left click operation or the like has been performed, as the operation information "Flick" to the portable terminal 2.

After execution of the processing in step S94, the control unit 10 causes the operation to proceed to step S100 to make a decision as to whether any release operation has been performed by the user. As a result, if it is decided that a release operation has been performed, that is, if the flick operation detected in step S91 is completed, the operation proceeds to step S110. If not, the operation proceeds to step 91 to repeat the above-mentioned processing.

As explained above, during the period of time from the detection of the flick operation in step S91 to the detection of the release operation in step S100, the processing in steps S92 to S94 is repeatedly executed at the predetermined time intervals. As a result, as explained referring to FIG. 8, the touch positions 43 to 46 in the flick operation are detected at the predetermined time intervals and the displacement quantities Px1 to Px3 in the X direction and the displacement quantities Py1 to Py3 in the Y direction, respectively, between any two adjacent touch positions are calculated. Then, the displacement quantities after conversion Qx1 to Qx3 in the X direction and the displacement quantities after conversion Qy1 to Qy3 in the Y direction, respectively, are calculated and the dislocation quantity information according to the respective dislocation quantities after conversion together with the button operation information are transmitted from the in-vehicle device 1 to the portable terminal 2 at the predetermined time intervals.

According to the second embodiment of the present invention explained above, the following operations and advantageous effects (9), in addition to the operations and advantageous effects (1) to (8) explained relating to the first embodiment, are obtained.

(9) When a flick operation is performed by moving a touch position during a touch operation by the user, the control unit 10 transmits the operation information "Move" in step S80 and transmits the operation information "Tap" in step S90. Subsequently, in step S94, it transmits the operation information "Flick" including the button operation information representing a predetermined button operation and the displacement quantity information according to the displacement quantities of the touch position. This enables determination of the content of the flick operation to the in-vehicle device 1 performed by the user at the portable terminal 2 with certainty.

In the embodiment described above, an example has been explained in which the transmission of video signals and audio signals from the portable terminal 2 to the in-vehicle device 1 is enabled by connecting the in-vehicle device 1 and the portable terminal 2 with each other via the video/audio cable 3. In addition, an example has been explained in which the in-vehicle device 1 and the portable terminal 2 communicate with each other through short-range wireless communication carried out in compliance with a predetermined communication standard such as Bluetooth in the embodiment described above. However, the present invention may be achieved in conjunction with another communication method or another signal transmission method. For instance, video signals and audio signals originating from the portable terminal 2 may be transmitted to the in-vehicle device 1 through wireless communication. In addition, communication between the in-vehicle device 1 and the portable terminal 2 may be carried out through wired communication such as USB communication. On this occasion, in steps S80, S90, S110 and S120 in FIG. 7, the displacement quantity information and the button operation information can be transmitted from the in-vehicle device 1 to the portable terminal 2 by using the communication format for a mouse used in USB or the like instead of the HID packet described earlier. Any communication method may be adopted in the present invention as long as it allows the in-vehicle device 1 and the portable terminal 2 to exchange necessary signals and information.

In the embodiment described above, various types of vehicle information output from the vehicle other than the vehicle speed signal and the parking signal may also be obtained by the in-vehicle device 1. Such vehicle information taken into the in-vehicle device 1 may then be utilized in the processing executed in the in-vehicle device 1, or it may be output from the in-vehicle device 1 to the portable terminal 2 and used in the processing executed at the portable terminal 2. For instance, a configuration may be adopted in which a start-up condition in correspondence to such vehicle information may be set in advance for each application and when the vehicle information indicating a specific start-up condition is output from the vehicle, the corresponding application may be started up automatically at the portable terminal 2. On this occasion, the information indicating the start-up conditions for the individual applications may be transmitted from the portable terminal 2 to the in-vehicle device 1 and a decision as to whether or not a start-up condition exists may be made in the in-vehicle device 1 based upon the vehicle information. As an alternative, the vehicle information may be transmitted from the in-vehicle device 1 to the portable terminal 2 and the decision as to whether or not a start-up condition exists may be made at the portable terminal 2 based upon the vehicle information. Such use of the vehicle information makes it possible for the portable terminal 2 to automatically start-up an application that, for instance, enables a search for gas stations located near the current position when vehicle information, indicating that the quantity of remaining fuel in the vehicle has become less than a predetermined quantity, is output from the vehicle.

In the embodiment described above, the example is explained in which a touch panel is adopted as the display unit 11 of the in-vehicle device 1 and an image received from the portable terminal 2 is brought up on display at the display unit 11. However, the present invention is not limited to this example. The present invention can be adopted in any display device as far as it can be connected with an information terminal and brings up on display an image received from the information terminal on a touch panel.

The embodiment and variations thereof described above simply represent examples and the present invention is in no way limited to these examples as long as the features characterizing the present invention remain intact. In addition, the embodiment and variations thereof described above may be adopted in any combination to realize a combination of advantages.

The disclosure of the following priority application is herein incorporated by reference: Japanese Patent Application No. 2013-50791 (filed on Mar. 13, 2013).

REFERENCE SIGNS LIST

1: in-vehicle device, 2: portable terminal, 3: video/audio cable, 10: control unit, 11: display unit, 12: operation unit, 13: audio output unit, 14: memory unit, 15: short-range wireless communication interface unit, 16: video/audio signal input unit, 20: control unit, 21: display unit, 22: operation unit, 23: audio output unit, 24: memory unit, 25: short-range wireless communication interface unit, 26: video/audio signal output unit, 27: wireless communication unit, 28: GPS receiver unit.

The invention claimed is:

1. A display device configured to be connected to an information terminal, the display device comprising:
a receiver that receives video information about a screen including a cursor from the information terminal;

a touch panel that brings up the screen on display based on the video information received by the video reception unit and detects a touch position specified by a touch operation; and a transmitter that transmits operation information in correspondence to the touch operation to the information terminal, wherein the transmitter transmits the operation information in a delay when the touch operation is performed continuously, the transmitter further transmits
- when the touch position is specified by the touch operation, first operation information for displacing the cursor from a predetermined reference position to the touch position,
- when specifying of the touch position is cancelled after the first operation information is transmitted, second operation information for returning the cursor from the touch position to the reference position, and
- when a next touch operation is performed within a predetermined interval time after the second operation information is transmitted, the first operation information for a next session in a delay.

2. The display device according to claim 1, wherein the operation information includes displacement quantity information that represents a displacement quantity of the cursor, and the transmitter transmits displacement quantity information in correspondence to a distance from the reference position to the touch position as the first operation information and predetermined displacement information in correspondence to the reference position as the second operation information.

3. The display device according to claim 1, wherein the transmitter transmits
- when the touch position is specified by the touch operation, third operation information representing a predetermined button operation after the first operation information is transmitted, and
- when the specifying of the touch position is cancelled after the third operation information is transmitted, fourth operation information representing cancellation of the button operation and subsequently the second operation information.

4. The display device according to claim 3, wherein the transmitter sets the displacement quantities of the cursor at 0 in the third operation information and the fourth operation information, respectively.

5. The display device according to claim 1, wherein the transmitter transmits, when the touch position is displaced during the touch operation, operation information including button operation information representing a predetermined button operation and displacement quantity information in correspondence to displacement quantity of the touch position after the first operation information is transmitted.

6. The display device according to claim 3, wherein the transmitter transmits, when the touch position is displaced during the touch operation, operation information including button operation information representing a predetermined button operation and displacement quantity information in correspondence to displacement quantity of the touch position after the first operation information and the third operation information is transmitted.

7. The display device according to claim 1, further comprising:
a controller that acquires interval time information about the interval time from the information terminal and determines whether to transmit the operation information in the delay based on the interval time information acquired by the interval time information acquisition unit.

8. The display device according to claim 7, wherein the interval time information is transmitted by the information terminal based on a policy file delivered from a predetermined server device to the information terminal.

* * * * *